US012706857B2

(12) United States Patent
Wang

(10) Patent No.: US 12,706,857 B2
(45) Date of Patent: Aug. 11, 2026

(54) PROCESSING METHOD, COMMUNICATION DEVICE AND STORAGE MEDIUM

(71) Applicant: SHENZHEN TRANSSION HOLDINGS CO., LTD., Guangdong (CN)

(72) Inventor: Sha Wang, Guangdong (CN)

(73) Assignee: SHENZHEN TRANSSION HOLDINGS CO., LTD., Guangdong (CN)

( * ) Notice: Subject to any disclaimer, the term of this patent is extended or adjusted under 35 U.S.C. 154(b) by 0 days.

(21) Appl. No.: 18/866,987

(22) PCT Filed: May 10, 2023

(86) PCT No.: PCT/CN2023/093201
§ 371 (c)(1),
(2) Date: Nov. 18, 2024

(87) PCT Pub. No.: WO2023/221831
PCT Pub. Date: Nov. 23, 2023

(65) Prior Publication Data

US 2025/0358234 A1 Nov. 20, 2025

(30) Foreign Application Priority Data

May 17, 2022 (CN) ......................... 202210531728.1

(51) Int. Cl.
*H04L 47/36* (2022.01)
*H04L 1/00* (2006.01)
(Continued)

(52) U.S. Cl.
CPC .......... *H04L 47/365* (2013.01); *H04L 1/0023* (2013.01); *H04W 28/06* (2013.01); *H04W 28/14* (2013.01); *H04W 28/22* (2013.01)

(58) Field of Classification Search
CPC ...... H04W 28/06; H04W 28/14; H04W 28/22
(Continued)

(56) References Cited

U.S. PATENT DOCUMENTS 8,432,866 B1 * 4/2013 Tapaninen ................ H04L 1/20 370/252
11,381,351 B2 * 7/2022 Liu ....................... H04L 1/1861
(Continued)

FOREIGN PATENT DOCUMENTS

CN 102447546 5/2012
CN 104365139 2/2015
(Continued)

OTHER PUBLICATIONS

Intel Corporation, "Report of email discussion: [NR-AH1801#09][NR] L2 buffer size (Intel)", 3GPP TSG-RAN WG2 Meeting #101, R2-1802956, Feb. 26-Mar. 2, 2018, pp. 1-14.
(Continued)

*Primary Examiner* — Joseph Arevalo
(74) *Attorney, Agent, or Firm* — JCIPRNET

(57) ABSTRACT

The present application provides a processing method, including: determining a first maximum transport block size according to cache information of service data, where the first maximum transport block size is less than or equal to a second maximum transport block size corresponding to a first device type; determining a buffer size of the service data according to the first maximum transport block size. Since the maximum transport block size is positively correlated with the buffer size of a terminal device, and for a reduced-capability device, the first maximum transport block size is less than or equal to the maximum transport block size corresponding to the first device type, the buffer size set by the reduced-capability device should be less than or equal to the buffer size of a terminal device of the first device type,
(Continued)

which can reduce a waste of hardware resources of the reduced-capability device.

20 Claims, 7 Drawing Sheets

(51) Int. Cl.
*H04W 28/06* (2009.01)
*H04W 28/14* (2009.01)
*H04W 28/22* (2009.01)

(58) Field of Classification Search
USPC ....... 370/329, 330, 236, 252, 312, 310, 311, 370/471
See application file for complete search history.

(56) References Cited

U.S. PATENT DOCUMENTS

| | | | | |
|---|---|---|---|---|
| 11,700,080 | B2* | 7/2023 | Ma | H04W 76/27 370/329 |
| 2017/0201984 | A1 | 7/2017 | Fu et al. | |
| 2020/0214065 | A1 | 7/2020 | Tomala et al. | |
| 2020/0374163 | A1* | 11/2020 | Zhao | H04L 5/0094 |
| 2021/0345374 | A1* | 11/2021 | Abotabl | H04L 5/14 |
| 2021/0345375 | A1* | 11/2021 | Abotabl | H04W 72/535 |
| 2021/0400526 | A1 | 12/2021 | Wu et al. | |
| 2022/0078826 | A1 | 3/2022 | Lee et al. | |
| 2024/0267933 | A1* | 8/2024 | Lee | H04W 72/04 |
| 2025/0358234 | A1* | 11/2025 | Wang | H04L 1/0041 |

FOREIGN PATENT DOCUMENTS

| | | |
|---|---|---|
| CN | 110073625 | 7/2019 |
| CN | 110166168 | 8/2019 |
| CN | 110278612 | 9/2019 |
| CN | 112534758 | 3/2021 |
| CN | 113784356 | 12/2021 |
| CN | 114466461 | 5/2022 |
| CN | 114640637 | 6/2022 |
| EP | 4096131 | 11/2022 |
| KR | 20210109254 | 9/2021 |
| WO | 2022032659 | 2/2022 |
| WO | 2022080392 | 4/2022 |

OTHER PUBLICATIONS

"International Search Report (Form PCT/ISA/210) of PCT/CN2023/093201," mailed on Jul. 19, 2023, with English translation thereof, pp. 1-4.

"Written Opinion of the International Searching Authority (Form PCT/ISA/237) of PCT/CN2023/093201," mailed on Jul. 19, 2023, with English translation thereof, pp. 1-9.

"Office Action of China Counterpart Application", issued on Jun. 28, 2022, with English translation thereof, p. 1-p. 39.

"Office Action of China Counterpart Application", issued on Jul. 27, 2022, with English translation thereof, p. 1-p. 45.

"Office Action of China Counterpart Application", issued on Aug. 23, 2022, with English translation thereof, p. 1-p. 10.

"Notice of allowance of China Counterpart Application", issued on Dec. 5, 2022, with English translation thereof, p. 1-p. 5.

"Search Report of Europe Counterpart Application", issued on Aug. 4, 2025, p. 1-p. 11.

"Office Action of Europe Counterpart Application", issued on Mar. 19, 2026, pp. 1-8.

* cited by examiner

PROCESSING METHOD, COMMUNICATION DEVICE AND STORAGE MEDIUM

CROSS-REFERENCE TO RELATED APPLICATION

The present application is a national stage of International application No. PCT/CN2023/093201, filed on May 10, 2023, which claims priority to Chinese patent application No. 202210531728.1, filed to the China National Intellectual Property Administration on May 17, 2022 and entitled "PROCESSING METHOD, COMMUNICATION DEVICE AND STORAGE MEDIUM". Both of the aforementioned applications are hereby incorporated by reference in their entireties.

TECHNICAL FIELD

The present application relates to the field of communication technologies and, in particular, to a processing method, a communication device and a storage medium.

BACKGROUND

According to existing communication specifications, a terminal device would reserve a buffer of a media access control (MAC) layer or a buffer of a physical layer for storing service data during a hybrid automatic repeat request (HARQ) process.

In a process of conceptualizing and realizing the present application, the applicant has found at least the following problem: for legacy terminal devices, since the data rate of its service data is relatively large, its buffer is also relatively large. For reduced-capability devices, since the data rate of the service data is usually small, adopting a larger buffer will result in a waste of hardware resources. However, there has not yet been a suitable solution of how to limit the rate of the service data to fit into a smaller fixed buffer size.

The preceding description is intended to provide general background information and does not necessarily constitute the prior art.

SUMMARY

In view of the above technical problem, the present application provides a processing method, a communication device and a storage medium, so as to reduce a buffer of a terminal device and reduce a waste of hardware resources.

In a first aspect, the present application provides a processing method, which can be applied to a terminal device (such as a mobile phone). The method includes:

step S1, determining a first maximum transport block size according to cache information of service data, where the first maximum transport block size is less than or equal to a second maximum transport block size corresponding to a first device type;

step S2, determining a buffer size of the service data according to the first maximum transport block size.

In an implementation, the cache information includes at least one of the following:

a first radio resource overhead parameter;

a first frequency-domain mapping parameter;

a first modulation and coding scheme parameter;

a first scaling factor.

In an implementation, at least one of the following is met:

the first radio resource overhead parameter is greater than or equal to a second radio resource overhead parameter of the first device type;

a value of the first radio resource overhead parameter includes at least one of the following: 0, 6, 12, 18, 30;

if a configuration type of a demodulation reference signal is a first configuration type, then the first frequency-domain mapping parameter $k=0, 1, 2, \ldots, n-1$, where n is a number of resource elements within a bandwidth part occupied by a physical downlink shared channel, and n is a positive integer;

if the configuration type of the demodulation reference signal is a second configuration type, then the first frequency-domain mapping parameter $k=4i+k'+\Delta$, where k is less than or equal to n, k' is 0 or 1, i is 0, 1, 2, . . . , and $\Delta$ is a positive integer greater than or equal to 0;

the first modulation and coding scheme parameter includes a first modulation strategy parameter and/or a first target code rate;

the first scaling factor is less than or equal to a second scaling factor corresponding to the first device type;

the first scaling factor includes at least one of the following: 1, 0.5, 0.25, 0.4.

In an implementation, for any modulation and coding scheme index, the first modulation strategy parameter is less than or equal to a second modulation strategy parameter corresponding to the first device type; and/or, the first target code rate is less than or equal to a second target code rate corresponding to the first device type.

In an implementation, step S1 includes:

determining a number of available resource elements in each physical resource block of a physical downlink shared channel according to the first radio resource overhead parameter and/or the first frequency-domain mapping parameter;

determining the first maximum transport block size according to at least one of the number of available resource elements, the first modulation and coding scheme parameter and the first scaling factor.

In an implementation, a channel carrying the service data includes at least one of the following:

a physical downlink shared channel scrambled with a cell radio network temporary identifier;

a physical downlink shared channel scrambled with a modulation coding scheme cell radio network temporary identifier;

a physical downlink shared channel scrambled with a temporary cell radio network temporary identifier;

a physical downlink shared channel scrambled with a configured scheduling radio network temporary identifier;

a physical downlink shared channel scrambled with a system information radio network temporary identifier;

a physical downlink shared channel scrambled with a paging radio network temporary identifier;

a physical downlink shared channel scrambled with a random access radio network temporary identifier.

In an implementation, the buffer size includes:

a Layer 1 buffer size of the service data and/or a Layer 2 buffer size of the service data.

In a second aspect, the present application provides a processing method, which can be applied to a terminal device (such as a mobile phone). The method includes:

determining a first maximum transport block size according to a preset parameter, where the first maximum transport block size is less than or equal to a second maximum transport block size corresponding to a first device type;

determining a buffer size of service data according to the first maximum transport block size.

In an implementation, the preset parameter includes at least one of the following:

a number of available resource elements in each physical resource block of a physical downlink shared channel;

a first modulation and coding scheme parameter;

a first scaling factor.

In an implementation, a determining manner of the number of available resource elements in each physical resource block of the physical downlink shared channel is:

determining the number of available resource elements in each physical resource block of the physical downlink shared channel according to a first radio resource overhead parameter and/or a first frequency-domain mapping parameter.

In an implementation, at least one of the following is met:

the first radio resource overhead parameter is greater than or equal to a second radio resource overhead parameter of the first device type;

a value of the first radio resource overhead parameter includes at least one of the following: 0, 6, 12, 18, 30;

if a configuration type of a demodulation reference signal is a first configuration type, then the first frequency-domain mapping parameter k=0, 1, 2, . . . , n−1, where n is a number of resource elements within a bandwidth part occupied by a physical downlink shared channel, and n is a positive integer;

if the configuration type of the demodulation reference signal is a second configuration type, then the first frequency-domain mapping parameter k=4i+k'+Δ, where k is less than or equal to n, k' is 0 or 1, i is 0, 1, 2, . . . , and A is a positive integer greater than or equal to 0;

the first modulation and coding scheme parameter includes a first modulation strategy parameter and/or a first target code rate;

the first scaling factor is less than or equal to a second scaling factor corresponding to the first device type;

the first scaling factor includes at least one of the following: 1, 0.5, 0.25, 0.4.

In an implementation, for any modulation and coding scheme index, the first modulation strategy parameter is less than or equal to a second modulation strategy parameter corresponding to the first device type; and/or, the first target code rate is less than or equal to a second target code rate corresponding to the first device type.

In an implementation, a channel carrying the service data includes at least one of the following:

a physical downlink shared channel scrambled with a cell radio network temporary identifier;

a physical downlink shared channel scrambled with a modulation coding scheme cell radio network temporary identifier;

a physical downlink shared channel scrambled with a temporary cell radio network temporary identifier;

a physical downlink shared channel scrambled with a configured scheduling radio network temporary identifier;

a physical downlink shared channel scrambled with a system information radio network temporary identifier;

a physical downlink shared channel scrambled with a paging radio network temporary identifier;

a physical downlink shared channel scrambled with a random access radio network temporary identifier.

In an implementation, the buffer size includes:

a Layer 1 buffer size of the service data and/or a Layer 2 buffer size of the service data.

In a third aspect, the present application provides a processing method, which can be applied to a network device (such as a base station), and includes the following step:

sending cache information of service data to a terminal device, where the cache information is used to indicate a first maximum transport block size, and the first maximum transport block size is less than or equal to a second maximum transport block size corresponding to a first device type.

In an implementation, the cache information includes at least one of the following:

a first radio resource overhead parameter;

a first frequency-domain mapping parameter;

a first modulation and coding scheme parameter;

a first scaling factor.

In an implementation, the method further includes at least one of the following:

the first radio resource overhead parameter is greater than or equal to a second radio resource overhead parameter of the first device type;

a value of the first radio resource overhead parameter includes at least one of the following: 0, 6, 12, 18, 30;

if a configuration type of a demodulation reference signal is a first configuration type, then the first frequency-domain mapping parameter k=0, 1, 2, . . . , n−1, where n is a number of resource elements within a bandwidth part occupied by a physical downlink shared channel, and n is a positive integer;

if the configuration type of the demodulation reference signal is a second configuration type, then the first frequency-domain mapping parameter k=4i+k'+Δ, where k is less than or equal to n, k' is 0 or 1, i is 0, 1, 2, . . . , and A is a positive integer greater than or equal to 0;

the first modulation and coding scheme parameter includes a first modulation strategy parameter and/or a first target code rate;

the first scaling factor is less than or equal to a second scaling factor corresponding to the first device type;

the first scaling factor includes at least one of the following: 1, 0.5, 0.25, 0.4.

In an implementation, for any modulation and coding scheme index, the first modulation strategy parameter is less than or equal to a second modulation strategy parameter corresponding to the first device type; and/or, the first target code rate is less than or equal to a second target code rate corresponding to the first device type.

In an implementation, the first radio resource overhead parameter and/or the first frequency-domain mapping parameter are used to determine a number of available resource elements in each physical resource block of a physical downlink shared channel, and at least one of the number of available resource elements, the first modulation and coding scheme parameter and the first scaling factor is used to determine the first maximum transport block size.

In an implementation, a channel carrying the service data includes at least one of the following:

a physical downlink shared channel scrambled with a cell radio network temporary identifier;

- a physical downlink shared channel scrambled with a modulation coding scheme cell radio network temporary identifier;
- a physical downlink shared channel scrambled with a temporary cell radio network temporary identifier;
- a physical downlink shared channel scrambled with a configured scheduling radio network temporary identifier;
- a physical downlink shared channel scrambled with a system information radio network temporary identifier;
- a physical downlink shared channel scrambled with a paging radio network temporary identifier;
- a physical downlink shared channel scrambled with a random access radio network temporary identifier.

In a fourth aspect, the present application provides a processing apparatus, including:

- a determining module, configured to determine a first maximum transport block size according to cache information of service data, where the first maximum transport block size is less than or equal to a second maximum transport block size corresponding to a first device type;
- a processing module, configured to determine a buffer size of the service data according to the first maximum transport block size.

In a fifth aspect, the present application provides a processing apparatus, including:

- a determining module, configured to determine a first maximum transport block size according to a preset parameter, where the first maximum transport block size is less than or equal to a second maximum transport block size corresponding to a first device type;
- a processing module, configured to determine a buffer size of service data according to the first maximum transport block size.

In a sixth aspect, the present application provides a processing apparatus, including:

- a sending module, configured to send cache information of service data to a terminal device, where the cache information is used to indicate a first maximum transport block size, and the first maximum transport block size is less than or equal to a second maximum transport block size corresponding to a first device type.

In a seventh aspect, the present application provides a communication device, including a memory and a processor;

- the memory is configured to store program instructions;
- the processor is configured to call the program instructions in the memory to execute the processing method according to any one of the first to third aspects.

In an eighth aspect, the present application provides a computer-readable storage medium, where a computer program is stored on the storage medium, and when the computer program is executed, the processing method according to any one of the first to third aspects is implemented. In a ninth aspect, the present application provides a computer program product, where the computer program product includes a computer program, and when the computer program is executed, the processing method according to any one of the first to third aspects is implemented.

In the processing method provided in the present application, firstly the first maximum transport block size is determined according to the cache information of the service data, and then the buffer size of the service data is determined according to the first maximum transport block size. For the terminal device such as a reduced-capability device, since the first maximum transport block size thereof is less than or equal to the maximum transport block size corresponding to the first device type, and the maximum transport block size is positively correlated with the buffer size of the terminal device, the buffer size set by the reduced-capability device is less than or equal to the buffer size of the terminal device of the first device type (i.e., a legacy terminal device), thereby reducing a waste of hardware resources of the reduced-capability device.

BRIEF DESCRIPTION OF THE DRAWINGS

Accompanying drawings here, which are incorporated into the specification and form a part of this specification, show embodiments in accordance with the present application and are used together with the specification to explain principles of the present application. In order to provide a clearer explanation of technical solutions of embodiments of the present application, a brief introduction will be given to the accompanying drawings required in a description of the embodiments. It is obvious that, for those of ordinary skills in the art, other accompanying drawings can be obtained based on these drawings without any creative effort.

Figure 1:
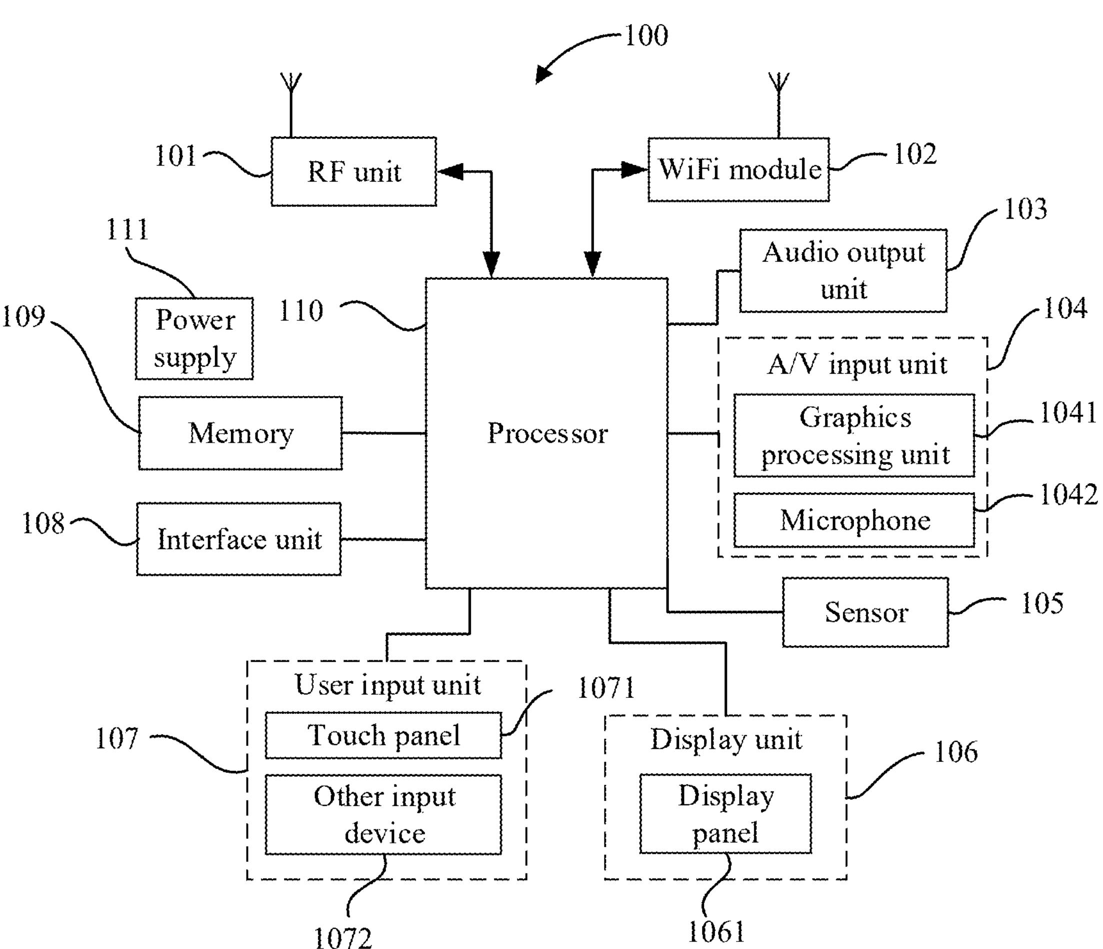
FIG. 1 is a schematic diagram of a hardware structure of a terminal device provided by an embodiment of the present application.

Realization of purposes, functional features and advantages of the present application will be further explained in conjunction with the embodiments and with reference to the accompanying drawings. Through the above accompanying drawings, clear embodiments of the present application have been shown, and more detailed descriptions will be provided in the following. These accompanying drawings and text descriptions are not intended to limit the scope of the concept of the present application in any way, but rather to illustrate the concept of the present application to those skilled in the art by referring to specific embodiments.

DESCRIPTION OF THE EMBODIMENTS

Exemplary embodiments will be described here in detail, and examples thereof are illustrated in the accompanying drawings. When the following description refers to the accompanying drawings, unless otherwise indicated, the same numbers in different drawings represent the same or similar elements. Implementations described in the following exemplary embodiments do not represent all implementations consistent with the present application. On the contrary, they are only examples of apparatuses and methods that are consistent with some aspects of the present application as detailed in the attached claims.

It should be noted that, the terms "including", "comprising" or any other variations thereof herein are intended to cover non-exclusive inclusion, so that a process, method, article or apparatus that includes a series of elements not only includes those elements, but also includes other elements that are not explicitly listed, or also includes elements inherent to such process, method, article or apparatus. Without further limitations, an element limited by a statement "including one . . . " does not exclude existence of other identical elements in the process, method, article or apparatus including this element. In addition, components, features and elements with the same name in different embodiments of the present application may have the same or different meanings, and their specific meanings need to be determined based on their interpretations in the specific embodiments or further in combination with the context in the specific embodiments.

It should be understood that although the terms "first", "second", "third" and the like may be used herein to describe various information, such information should not be limited to these terms. These terms are only used to distinguish the same type of information from each other. For example, without departing from the scope of the present application, first information can also be referred to as second information, and similarly, the second information can also be referred to as the first information. Depending on the context, the word 'if' used here can be interpreted as "when", "while" or "in response to determining . . . ". Furthermore, as used herein, singular forms "one", "a/an" and "the" are intended to also include a plural form, unless the context indicates otherwise. It should be further understood that the terms "including" and "comprising" indicate the existence of the described features, steps, operations, elements, components, items, types and/or groups, but do not exclude the existence, appearance or addition of one or more other features, steps, operations, elements, components, items, types and/or groups. The terms "or", "and/or", "including at least one of the following" and others used in the present application may be interpreted as inclusive or imply any one or any combination. For example, "including at least one of the following: A, B, C" means "any of the following: A; B; C; A and B; A and C; B and C; A and B and C". For another example, "A, B or C" or "A, B and/or C" means "any of the following: A; B; C; A and B; A and C; B and C; A and B and C". Only when there is a combination of elements, functions, steps or operations which are inherently exclusive of each other in certain ways, an exception to this definition occurs.

It should be understood that although various steps in flowcharts in embodiments of the present application are sequentially displayed according to an indication of arrows, these steps are not necessarily executed in the order indicated by the arrows. Unless explicitly stated herein, there is no strict order limit for the execution of these steps, which can be executed in other order. Moreover, at least part of the steps in the diagram may include multiple sub-steps or multiple stages. These sub-steps or stages may not necessarily be completed at the same time, but may be executed at different times. Their execution order may not necessarily be sequential, and they may be executed in turn with, or alternately with, at least part of other steps or at least part of sub-steps or stages of other steps.

Depending on the context, for example, the words "if" and "in case of" used herein can be interpreted as "when . . . " or "while . . . " or "in response to determining . . . " or "in response to detecting . . . ". Similarly, depending on the context, the phrases "if determining . . . " or "if detecting . . . (the stated condition or event)" can be interpreted as "when it is determined . . . " or "in response to determining . . . " or "when (the stated condition or event) is detected" or "in response to detecting (the stated condition or event)".

It should be noted that step codes such as S1, S2 and the like are used herein for the purpose of expressing the corresponding content more clearly and concisely, and do not constitute substantive limitations on the order. Those skilled in the art may for example execute S2 first and then S1 in specific implementations, and these should be within the protection scope of the present application.

It should be understood that the specific embodiments described here are only used to explain the present application and are not intended to limit it.

In the following description, suffixes such as "module", "component" or "unit" used to represent elements are only used for the purpose of facilitating the explanation of the present application and have no specific meanings in themselves. Therefore, "module", "component" or "unit" can be used in a mixed manner.

A terminal device may be a mobile terminal, and the mobile terminal may be implemented in various forms. For example, the mobile terminal described in the present application may include mobile terminals such as a mobile phone, a tablet, a laptop, a handheld computer, a personal digital assistant (PDA), a portable media player (PMP), a navigation apparatus, a wearable device, a smart wristband, a pedometer, etc., and fixed terminals such as a digital TV, a desktop computer, etc.

In the following description, the mobile terminal will be used as an example for explanation. Those skilled in the art will understand that in addition to elements specifically used for mobile purposes, constructions according to the implementations of the present application can also be applied to fixed-type terminals.

Please refer to FIG. 1, which is a schematic diagram of a hardware structure of a mobile terminal for implementing various embodiments of the present application. The mobile terminal 100 can include: an radio frequency (RF) unit 101, a WiFi module 102, an audio output unit 103, an audio/video (A/V) input unit 104, a sensor 105, a display unit 106, a user input unit 107, an interface unit 108, a memory 109, a processor 110, a power supply 111 and other components.

Those skilled in the art can understand that the structure of the mobile terminal shown in FIG. 1 does not constitute a limitation on the mobile terminal, and the mobile terminal can include more or fewer components than those shown in the drawings, or combine certain components, or have different component arrangements.

The following is a specific introduction to the components of the mobile terminal in conjunction with FIG. 1.

The radio frequency unit 101 can be used to receive and send signals during receiving and sending information or during a call, specifically, to receive downlink information from a base station and then provide the same to the processor 110 for processing, and additionally, to send uplink data to the base station. Typically, the radio frequency unit 101 includes but is not limited to an antenna, at least one amplifier, a transceiver, a coupler, a low noise amplifier, a duplexer, etc. In addition, the radio frequency unit 101 can also communicate with a network and other devices through wireless communication. The above wireless communication can use any communication standard or protocol, including but not limited to global system of mobile communication (GSM), general packet radio service (GPRS), code division multiple access 2000 (CDMA2000), wideband code division multiple access (WCDMA), time division-synchronous code division multiple access (TD-SCDMA), frequency division duplexing-long term evolution (FDD-LTE), time division duplexing-long term evolution (TDD-LTE) and 5G, etc.

WiFi belongs to short range wireless transmission technology, and the mobile terminal can help a user to send and receive emails, browse web pages and access streaming media through the WiFi module 102, which provides the user with wireless broadband internet access. Although FIG. 1 illustrates the WiFi module 102, it can be understood that it is not a necessary component of the mobile terminal and can be omitted without changing an essence of the application based on requirements.

The audio output unit 103 can convert audio data received by the radio frequency unit 101 or the WiFi module 102 or stored in the memory 109 into an audio signal and output it as sound when the mobile terminal 100 is in a mode such as a call signal reception mode, a call mode, a recording mode, a voice recognition mode, a broadcast reception mode, etc. Moreover, the audio output unit 103 can also provide an audio output related to a specific function performed by the mobile terminal 100 (such as sound of call signal reception, sound of message reception, etc.). The audio output unit 103 may include a speaker, a buzzer, etc.

The A/V input unit 104 is used to receive audio or video signals. The A/V input unit 104 may include a graphics processing unit (GPU) 1041 and a microphone 1042. The graphics processing unit 1041 processes image data of still images or videos obtained by an image capture apparatus (such as a camera) in a video capture mode or an image capture mode. The processed image frames can be displayed on the display unit 106. The image frames processed by the graphics processing unit 1041 can be stored in the memory 109 (or other storage medium) or sent through the radio frequency unit 101 or the WiFi module 102. The microphone 1042 can receive sound (audio data) through the microphone 1042 in an operation mode such as a phone call mode, a recording mode, a voice recognition mode and the like, and can process such sound into the audio data. The processed audio (voice) data can be converted into a format that can be sent to a mobile communication base station through the radio frequency unit 101 in the phone call mode for output. The microphone 1042 can implement various types of noise cancellation (or suppression) algorithms to eliminate (or suppress) noises or interferences generated in a process of receiving and sending the audio signals.

The mobile terminal 100 also includes at least one sensor 105, such as a light sensor, a motion sensor and other sensors. In an implementation, the light sensor includes an ambient light sensor and a proximity sensor. In an implementation, the ambient light sensor can adjust brightness of the display panel 1061 according to brightness of ambient light. The proximity sensor can turn off the display panel 1061 and/or backlight when the mobile terminal 100 is moved to an ear. As a type of the motion sensor, an accelerometer sensor can detect the magnitude of acceleration in various directions (usually in three axes), and can detect the magnitude and direction of gravity when it is stationary, which can be used for applications for recognizing a mobile phone posture (such as switching between horizontal and vertical screens, related games, magnetometer posture calibration), vibration recognition related functions (such as a pedometer, tapping) and the like. As for other sensors that can be configured on the mobile phone, such as a fingerprint sensor, a pressure sensor, an iris sensor, a molecular sensor, a gyroscope, a barometer, a hygrometer, a thermometer, an infrared sensor and other sensors, they will not be elaborated here.

The display unit 106 is used to display information input by a user or provided to the user. The display unit 106 can include a display panel 1061, which can be configured in a form of liquid crystal display (LCD), organic light emitting diode (OLED) and the like.

The user input unit 107 can be used to receive input numerical or character information, and generate key signal inputs related to user settings and functional control of the mobile terminal. In an implementation, the user input unit 107 may include a touch panel 1071 and other input devices 1072. The touch panel 1071, also known as a touch screen, can collect touch operations performed by the user on or near it (such as operations performed by the user on or near the touch panel 1071 using any suitable object or accessory such as a finger, a stylus and the like), and drive a corresponding connection apparatus according to a preset program. The touch panel 1071 may include two parts: a touch detection apparatus and a touch controller. In an implementation, the touch detection apparatus detects a touch orientation of the user, detects a signal brought by a touch operation, and transmits the signal to the touch controller. The touch controller receives touch information from the touch detection apparatus, converts the touch information into contact coordinates, sends them to the processor 110, and receives and executes a command from the processor 110. In addition, various types such as a resistance type, a capacitance type, an infrared type and a surface acoustic wave type can be used to achieve the touch panel 1071. In addition to the touch panel 1071, the user input unit 107 can also include other input devices 1072. In an implementation, the other input devices 1072 may include but are not limited to one or more of a physical keyboard, function keys (such as volume control buttons, switch buttons and the like), a trackball, a mouse, a joystick and the like, which is not limited here.

In an implementation, the touch panel 1071 can cover the display panel 1061. When a touch operation is detected on or near the touch panel 1071, it is transmitted to the processor 110 to determine a touch event type. Subsequently, the processor 110 provides a corresponding visual output on the display panel 1061 according to the touch event type. Although in FIG. 1, the touch panel 1071 and the display panel 1061 are used as two independent components to implement input and output functions of the mobile terminal, in some embodiments, the touch panel 1071 can be integrated with the display panel 1061 to achieve the input and output functions of the mobile terminal, which is not limited here.

The interface unit 108 serves as an interface through which at least one external apparatus can be connected to the mobile terminal 1000. For example, the external apparatus can include a wired or wireless headphone port, an external power supply (or battery charger) port, a wired or wireless data port, a memory card port, a port for connecting an apparatus with a recognition module, an audio input/output (I/O) port, a video I/O port, an earphone port, and the like. The interface unit 108 can be used to receive inputs from the external apparatus (such as data information, power and the like) and transmit the received inputs to one or more elements within the mobile terminal 100 or can be used to transmit data between the mobile terminal 100 and the external apparatus.

The memory 109 can be used to store software programs and various data. The memory 109 may mainly include a program storage area and a data storage area. In an implementation, the program storage area may store an operation system, an application program required for at least one function (such as a sound playback function, an image playback function, etc.) and the like. The data storage area can store data created according to usage of the mobile phone (such as audio data, phone book and the like). In addition, the memory 109 may include a high-speed random access memory, as well as a non-volatile memory, such as at least one disk storage device, flash memory device, or other volatile solid-state storage devices.

The processor 110 is a control center of the mobile terminal, which connects various parts of the entire mobile terminal through various interfaces and lines. By running or executing software programs and/or modules stored in the memory 109, as well as calling the data stored in the memory 109, various functions and data processing of the mobile terminal are executed, thereby performing overall monitoring of the mobile terminal. The processor 110 may include one or more processing units; preferably, an application processor and a modulation and demodulation processor can be integrated in the processor 110. In an implementation, the application processor mainly processes the operation system, user interfaces, application programs and the like, while the modulation and demodulation processor mainly processes wireless communication. It can be understood that the modulation and demodulation processor mentioned above may not be integrated into the processor 110.

The mobile terminal 100 can also include the power supply 111 (such as a battery) that supplies powers to various components. Preferably, the power supply 111 can be logically connected to the processor 110 through a power management system, thereby achieving functions such as charging, discharging and power consumption management through the power management system.

Although not shown in FIG. 1, the mobile terminal 100 may also include a Bluetooth module and the like, which will not be elaborated here.

In order to facilitate an understanding of the embodiments of the present application, a communication network system on which the mobile terminal of the present application is based will be described below.

Figure 2:
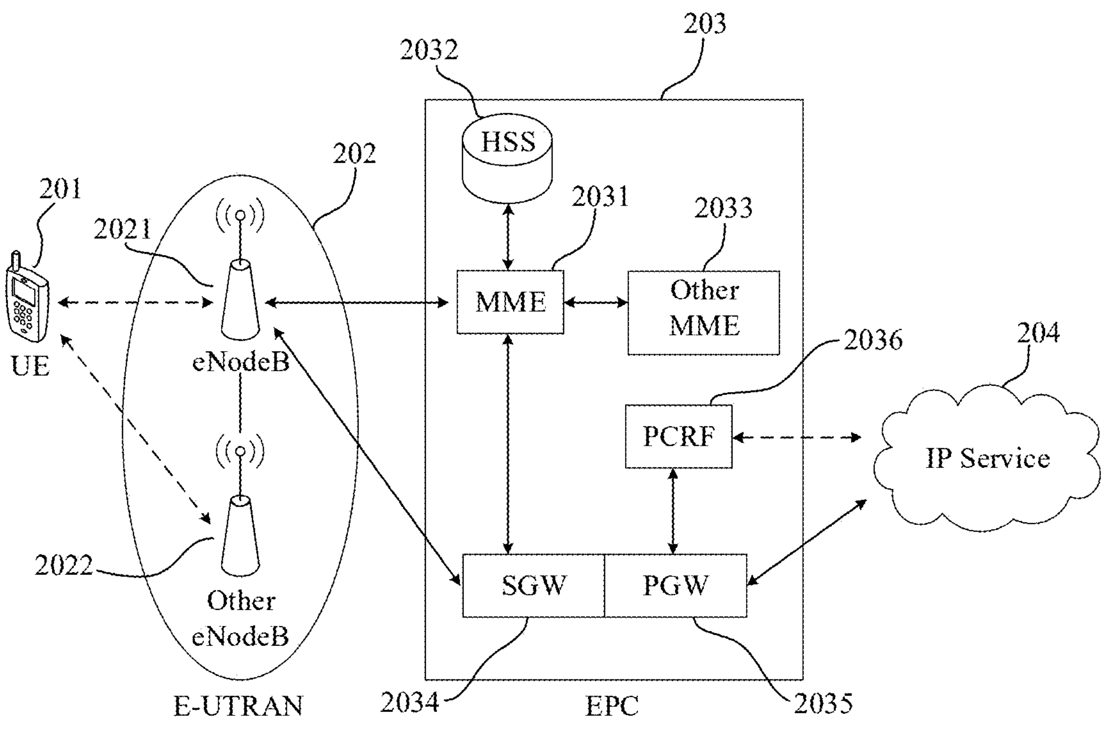
FIG. 2 is an architecture diagram of a communication network system provided by an embodiment of the present application.

Please refer to FIG. 2, which is an architecture diagram of a communication network system provided by an embodiment of the present application. The communication network system is an LTE system of general mobile communication technology, and the LTE system includes a user equipment (UE) 201, an evolved UMTS terrestrial radio access network (E-UTRAN) 202, an evolved packet core (EPC) 203 and an IP service 204 of an operator that are sequentially connected in a communicative manner.

In an implementation, the UE 201 can be the terminal 100 mentioned above, which will not be repeated here.

The E-UTRAN 202 includes an eNodeB 2021 and other eNodeB 2022, etc. In an implementation, the eNodeB 2021 can be connected to the other eNodeB 2022 through backhaul (backhaul) (such as X2 interface); the eNodeB 2021 can be connected to the EPC 203, and the eNodeB 2021 can provide access from the UE 201 to the EPC 203.

The EPC 203 can include an mobility management entity (MME) 2031, an home subscriber server (HSS) 2032, other MME 2033, an serving gate way (SGW) 2034, a packet data network gate way (PGW) 2035, a policy and charging rules function (PCRF) 2036, and the like. In an implementation, the MME 2031 is a control node that handles signaling between the UE 201 and the EPC 203, providing bearer and connection management. The HSS 2032 is used to provide some registers to manage functions such as home location registers (not shown in the drawings), and to store some user specific information related to service characteristics, data rate, etc. All user data can be sent through the SGW 2034, and the PGW 2035 can provide IP address allocation and other functions for the UE 201. The PCRF 2036 is a policy decision point of policy and charging control for service data flows and IP bearer resources, which selects and provides available policy and charging control decisions for a policy and charging enforcement functional unit (not shown in the drawings).

The IP service 204 can include the Internet, intranet, IP multimedia subsystem (IMS) or other IP services.

Although the above introduction takes the LTE system as an example, those skilled in the art should be aware that the present application is not only applicable to the LTE system, but also to other wireless communication systems, such as GSM, CDMA2000, WCDMA, TD-SCDMA, and future new network systems (such as 5G), etc., which are not limited here.

Based on the hardware structure of the mobile terminal and the communication network system as mentioned above, various embodiments of the present application are proposed.

Three major application scenarios of 5G include enhanced Mobile Broadband (eMBB), massive Machine Type Communication (mMTC), and ultra Reliable and Low Latency Communication (uRLLC). Except the application scenarios such as eMBB and uRLLC, mid-range IoT use cases such as industrial wireless sensors, video surveillance and wearable devices require 5G terminals to reduce complexity and cost, size, as well as energy consumption, etc. Therefore, a new device type has been proposed for terminal devices, namely terminal devices with low complexity and low cost or reduced capability devices (i.e., RedCap UE), to better meet the requirements of these use cases.

The terminal device may include reduced-capability devices and legacy devices. The reduced-capability devices may include, for example, household appliances such as a refrigerator, a television, an air conditioner and the like, wearable devices such as a smart watch, a sports bracelet and the like, smart industrial devices such as a smart grid, a smart meter and the like, and may also include smartphones with low power consumption/low complexity/low cost/low performance and some functional phones. The legacy devices may include, for example, smartphones, smart cars and the like. The difference between the reduced-capability device and the legacy device is not limited to the device type. For example, a legacy device in a state of low power consumption or low performance may also be used as a reduced-capability device. The difference between reduced-capability devices and legacy devices mainly lies in the bandwidth, data rate and other characteristics supported by the device.

On the basis of the introduction of the different device types of the terminal devices, buffers of the terminal devices will be introduced.

In some implementations, during transmission or processing of service data, a terminal device would reserve a buffer of an MAC layer or a buffer of a physical layer for storing the service data during HARQ process. In an implementation, the buffer of the terminal device includes a Layer 1 buffer and a Layer 2 buffer. A size of the Layer 1 buffer is positively correlated with the maximum transport block size, while a size of the Layer 2 buffer is positively correlated with magnitude of a data rate.

The terminal devices include devices of these two different device types, namely the legacy devices and the reduced-capability devices. The data rate for transmitting the service data by the legacy device is relatively high, so its buffer is also relatively large. Since the data rate for transmitting the service data by the reduced-capability device is relatively low, using the buffer with the same size as that of the legacy device may result in a waste of hardware resources for the reduced-capability device. Based on this, the present application provides a processing method to determine the buffer size of the reduced-capability device and reduce the waste of hardware resources.

Figures 3, 4, 5:
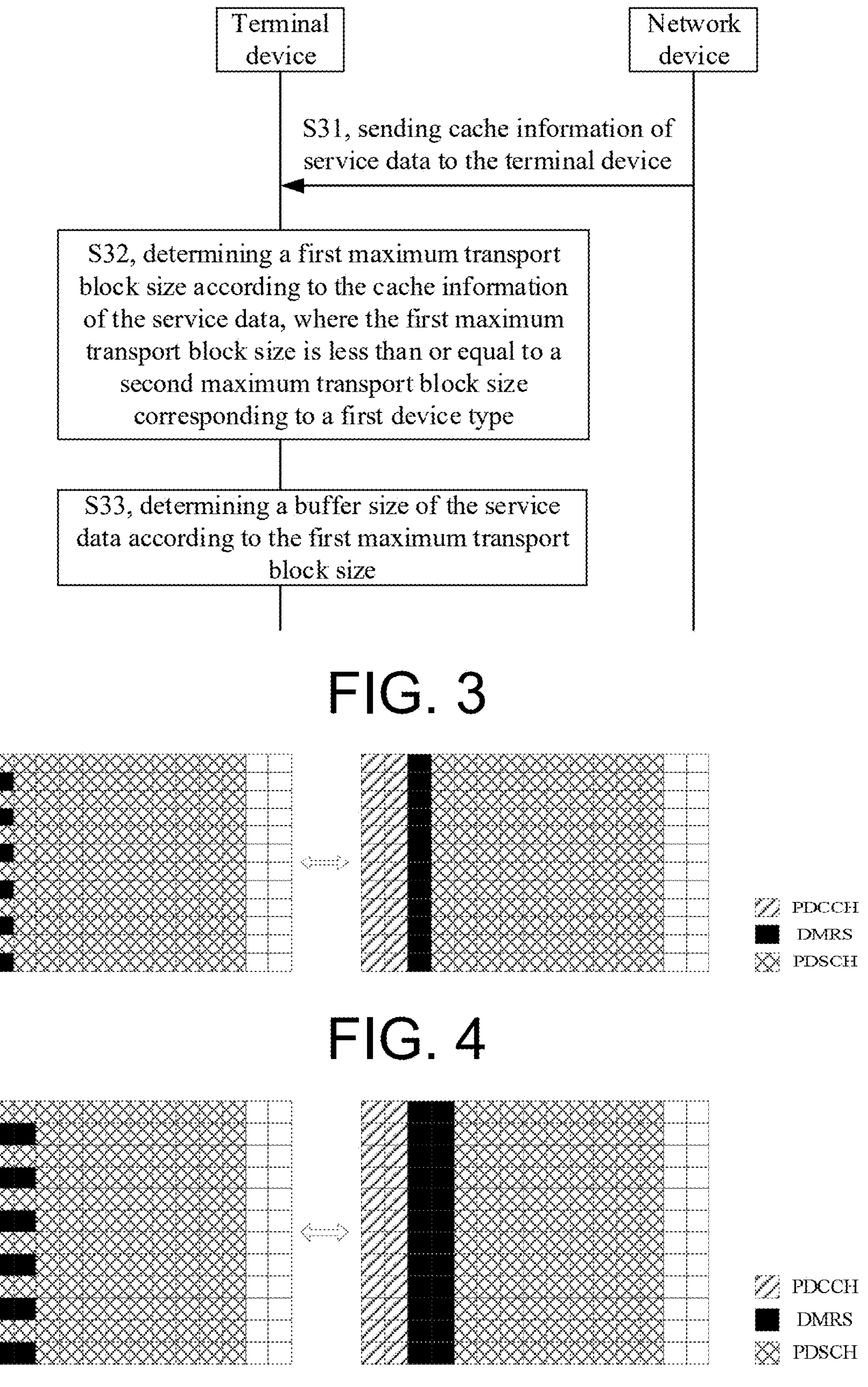
FIG. 3 is signaling diagram I of a processing method provided by an embodiment of the present application.
FIG. 4 is schematic comparison diagram I of DMRS mapping provided by an embodiment of the present application.
FIG. 5 is schematic comparison diagram II of DMRS mapping provided by an embodiment of the present application.

FIG. 3 is signaling diagram I of a processing method provided by an embodiment of the present application. As shown in FIG. 3, the method can be applied to a terminal device, and specifically includes the following steps.

S31, a network device sends cache information of service data to the terminal device.

The network device can be a device used to communicate with the terminal device. For example, the network device may be: a base transceiver station (TS) in a global system for mobile communication (GSM) or a code division multiple access (CDMA) communication system; or a base station (NodeB, NB) in a wideband code division multiple access (WCDMA) system; or an evolutionary base station (Evolutional Node B, eNB or eNodeB) in an LTE system. Or, the network device may be a relay station, an access point, an onboard device, a wearable device, a network side device in a future 5G network or a network after 5G, or a network device in a future evolving public land mobile network (PLMN) network.

The network device involved in the embodiment of the present application may also be referred to as a radio access network (RAN) device. The RAN device is connected to the terminal device to receive data from the terminal device and send data to a core network device. The RAN device corresponds to a different device in a different communication system. For example, the RAN device corresponds to a base station and a base station controller in a 2G system, corresponds to a base station and a radio network controller (RNC) in a 3G system, corresponds to an evolutionary base station (Evolutional Node B, eNB) in a 4G system, corresponds to an access network device (such as a gNB, a centralized unit CU, a distributed unit DU) of a 5G system (such as a New Radio (NR)) in the 5G system.

The network device can send the cache information of the service data to the terminal device, and a first maximum transport block size is indicated by the cache information.

S32, the terminal device determines the first maximum transport block size according to the cache information of the service data, where the first maximum transport block size is less than or equal to a second maximum transport block size corresponding to a first device type.

The terminal device in the embodiment of the present application may be either a legacy device or a reduced-capability device.

In an implementation, the terminal device in the embodiment of the present application is a reduced-capability device, and a device of the first device type is a legacy device. The first maximum transport block size of the terminal device can be determined according to the cache information of the service data. The first maximum transport block size is less than or equal to the second maximum transport block size corresponding to the first device type. That is, the first maximum transport block size is less than or equal to the second maximum transport block size corresponding to the legacy device.

S33, the terminal device determines a buffer size of the service data according to the first maximum transport block size.

In an implementation, a buffer size of service data includes a Layer 1 buffer size of the service data and/or a Layer 2 buffer size, where the Layer 1 buffer size is positively correlated with the maximum transport block size of the terminal device. In the embodiment of the present application, the first maximum transport block size of the terminal device is less than or equal to the maximum transport block size corresponding to the first device type. Therefore, the Layer 1 buffer size of the terminal device is less than or equal to the Layer 1 buffer size corresponding to the first device type, thereby the buffer size of the service data of the terminal device is less than or equal to the buffer size of the service data corresponding to the first device type.

In the processing method provided by the embodiment of the present application, firstly the first maximum transport block size is determined according to the cache information of the service data, and then the buffer size of the service data is determined according to the first maximum transport block size. For the terminal device such as the reduced-capability device, since its first maximum transport block size is less than or equal to the maximum transport block size corresponding to the first device type, and the maximum transport block size is positively correlated with the buffer size of the terminal device, the buffer size set by the reduced-capability device is less than or equal to the buffer size of the terminal device in the first device type (i.e., the legacy terminal device). That is, by limiting the buffer size of the reduced-capability device, a waste of hardware resources can be reduced.

In the above embodiment, a solution is introduced to reduce the maximum transport block size and thus reduce a buffer of the terminal device by setting the first maximum transport block, where the first maximum transport block size is less than or equal to the maximum transport block size corresponding to the first device type. In the following, a detailed introduction to a solution of determining the first maximum transport block size will be given in combination with specific embodiments.

Firstly, a calculation process of the maximum transport block size of the terminal device is introduced.

Let a number of available resource elements (REs) allocated to each PRB of a physical downlink shared channel (PDSCH) be $$N'_{RE}$$

a calculation formula for $$N'_{RE}$$

is shown in Formula (1):

$$N'_{RE} = N_{sc}^{RB} * N_{symb}^{sh} - N_{DMRS}^{PRB} - N_{oh}^{PRB} \quad (1)$$

where $$N_{symb}^{sh}$$

is a number of symbols allocated to the PDSCH within one slot;

$$N_{DMRS}^{PRB}$$

is a number of REs occupied by a demodulation reference signal (DMRS) in each physical resource block (PRB);

$$N_{oh}^{PRB}$$

is a radio resource overhead parameter and is configured by a high-level parameter xOverhead in PDSCH-ServingCell-Config, when $$N_{oh}^{PRB}$$

is configured, a value of $$N_{oh}^{PRB}$$

is any one of 6, 12, 18, and/or, when $$N_{oh}^{PRB}$$

is not configured, the value of $$N_{oh}^{PRB}$$

is 0, which means that $$N_{oh}^{PRB} \in \{0, 6, 12, 18\}; \text{ and } N_{sc}^{RB} = 12.$$

After determining $$N'_{RE}$$

according to Formula (1), a total number $N_{RE}$ of available REs corresponding to available PRBs can be obtained according to Formula (2) shown below:

$$N_{RE} = \min(156, N'_{RE}) * n_{PRB}. \quad (2)$$

In an implementation, an intermediate variable $N_{info}$ can be obtained according to $N_{RE}$:

$$N_{info} = N_{RE} * R * Q_m * v \quad (3)$$

where R is a code rate determined according to a modulation and coding scheme (MCS) index, $Q_m$ is a modulation strategy parameter determined according to the MCS index.

In the above embodiment, the solution of obtaining the intermediate variable $N_{info}$ is introduced, and $N'_{info}$ can be obtained according to $N_{info}$, where:

$$\text{when } N_{info} \le 3842,\ N'_{info} = \max\left(24, 2^2 * \left\lfloor \frac{N_{info}}{2^n} \right\rfloor\right), \quad (4)$$

$$\text{in Formula (4), } n = \max(3, \lfloor \log_2(N_{info} - 24) \rfloor - 5;$$

$$\text{when } N_{info} > 3842,\ N'_{info} = \max\left(3840, 2^2 * \text{round}\left(\frac{N_{info} - 24}{2^n}\right)\right), \quad (5)$$

$$\text{in Formula (5), } n = \lfloor \log_2(N_{info} - 24) \rfloor - 5.$$

After obtaining $$N'_{info},$$

the maximum transport block size can be calculated according to $$N'_{info}.$$

Specifically:

when the code rate R≤1/4, the maximum transport block size can be obtained as:

$$TBS = 8C * \left\lceil \frac{N'_{info} + 24}{8C} \right\rceil - 24,\ C = \left\lceil \frac{N'_{info} + 24}{3816} \right\rceil; \quad (6)$$

when the code rate R>1/4, the maximum transport block size can be obtained as:

$$TBS = 8C * \left\lceil \frac{N'_{info} + 24}{8C} \right\rceil - 24,\ C = \left\lceil \frac{N'_{info} + 24}{8424} \right\rceil,\ N'_{info} > 8424, \quad (7)$$

$$TBS = 8C * \left\lceil \frac{N'_{info} + 24}{8C} \right\rceil - 24,\ N'_{info} \le 8424. \quad (8)$$

Combining Formulas (1) to (8), the maximum transport block size can be obtained, and then the Layer 1 buffer size can be determined according to the maximum transport block size. In an implementation, the above solution of calculating the maximum transport block size is applicable to the terminal device of the first device type, i.e. the legacy device, and is also applicable to the terminal device of a second device type, i.e. the reduced-capability device.

Formulas (6) to (8) illustrate a calculation method for the maximum transport block size under different code rates R and different values of $$N'_{info}.$$

According to Formulas (6) to (8), it can be seen that TBS and $$N'_{info}$$

are positively correlated, that is, the larger the $$N'_{info},$$

the larger the TBS; otherwise, the smaller the $$N'_{info},$$

the smaller the TBS.

Formulas (4) and (5) illustrate a calculation method for $$N'_{info}$$

under different value ranges of $N_{info}$. According to Formulas (4) and (5), it can be seen that $$N'_{info}$$

and $N_{info}$ are also positively correlated, that is, the larger the $N_{info}$, the larger the $$N'_{info};$$

otherwise, the smaller the $N_{info}$, the smaller the $$N'_{info}.$$

Formulas (3) to (8) illustrate that the TBS is correlated with $N_{RE}$, R, $Q_m$ and so on. In summary, it can be concluded that the TBS could be reduced by reducing values of $N_{RE}$, R and $Q_m$, thereby achieving a purpose of reducing the buffer size of the terminal device; and that the TBS could also be reduced by modifying the calculation formula of $N_{info}$ in Formula (3), thereby achieving the purpose of reducing the buffer size of the terminal device.

In the embodiment of the present application, the first maximum transport block size can be determined according to the cache information of the service data. In an implementation, the cache information includes at least one of a first radio resource overhead parameter, a first frequency-domain mapping parameter, a first modulation and coding scheme parameter and a first scaling factor. In an implementation, the value of $N_{RE}$ can be reduced by means of the first radio resource overhead parameter and/or the first frequency-domain mapping parameter; the values of R and $Q_m$ can be reduced by means of the first modulation and coding scheme parameter; the calculation formula of $N_{info}$ can be modified on the basis of Formula (3) by means of the first scaling factor, so as to reduce $N_{info}$ and thus reduce the TBS. That is, by means of various parameters in the cache information, the purpose of reducing the TBS and thus reducing the buffer size of the terminal device can be achieved. In the following, the parameters in the cache information will be introduced respectively.

In an implementation, the number of available resource elements in each PRB of the PDSCH can be determined according to the first radio resource overhead parameter and/or the first frequency-domain mapping parameter, and then the first maximum transport block size can be determined according to at least one of the number of available resource elements, the first modulation and coding scheme parameter and the first scaling factor.

In an implementation, the cache information includes the first radio resource overhead parameter, where the first radio resource overhead parameter is a newly defined RRC parameter xOverhead-redcap, and is used to indicate reserved overhead of other resources on available PRBs of the PDSCH of the terminal device.

In an implementation, the first radio resource overhead parameter is a radio resource overhead parameter of the reduced-capability device.

In an implementation, the first radio resource overhead parameter is greater than or equal to a radio resource overhead parameter of the first device type.

It can be seen according to Formula (1) that, the number $$N'_{RE}$$

of available REs allocated to each PRB of the PDSCH can be obtained according to the radio resource overhead parameter $$N_{oh}^{PRB}.$$

Let the first radio resource overhead parameter be $$N_{oh1}^{PRB},$$

the second radio resource overhead parameter of the first device type be $$N_{oh2}^{PRB},$$

then the number of available REs allocated to each PRB of the PDSCH can be obtained as follows:

$$N'_{RE1} = N_{sc}^{RB} * N_{symb}^{sh} - N_{DMRS}^{PRB} - N_{oh1}^{PRB}$$

-continued $$N'_{RE2} = N_{sc}^{RB} * N_{symb}^{sh} - N_{DMRS}^{PRB} - N_{oh2}^{PRB}$$

where $$N'_{RE1}$$

is the number of available REs allocated to each PRB of the PDSCH corresponding to the reduced-capability device, and $N'_{RE2}$ is the number of available REs allocated to each PRB of the PDSCH corresponding to the legacy device. Since $$N_{oh1}^{PRB} \geq N_{oh2}^{PRB},\ N'_{RE1} \leq N'_{RE2},$$

that is, compared with the terminal device of the first device type, the number of available REs allocated to each PRB of the PDSCH is reduced by increasing the value of the radio resource overhead parameter. According to Formulas (2) to (7), it can be seen that the number $N_{RE}$ of available REs allocated to each PRB of the PDSCH is positively correlated with the TBS. Therefore, the TBS can also be reduced by reducing the number of available REs allocated to each PRB of the PDSCH. That is, the TBS of the reduced-capability device in the present application is less than or equal to the TBS corresponding to the first device type.

In an implementation, the value of the first radio resource overhead parameter includes at least one of the following: 0, 6, 12, 18, 30, that is, the first radio resource overhead parameter xOverload-redcap ∈{xOh0, xOh6, xOh12, xOh18, xOh30}.

In an implementation, the value of the second radio resource overhead parameter includes at least one of the following: 0, 6, 12, that is, the second radio resource overhead parameter xOverhead ∈{xOh0, xOh6, xOh12}.

Through increasing the radio resource overhead parameter, the maximum transport block size is reduced, so that the first maximum transport block size is less than or equal to the second maximum transport block size, thereby reducing the buffer size of the reduced-capability device and reducing a waste of hardware resources.

In the above embodiment, it is introduced that $$N'_{RE}$$

is reduced by setting the first radio resource overhead parameter, and thus $N_{RE}$ is reduced, thereby achieving the purpose of reducing TBS. In the following, a solution of reducing the TBS by means of the frequency-domain mapping parameter will be introduced.

The frequency-domain mapping parameter is used to indicate an RE location occupied by a DMRS in each PRB. Since a configuration type of the demodulation reference signal includes a first configuration type (i.e., a DRMS configuration type 1) and a second configuration type (i.e., a DRMS configuration type 2), corresponding frequency-domain mapping parameters are also different for different configuration types.

In an implementation, for the first configuration type, the first frequency-domain mapping parameter k1 corresponding to the reduced-capability device equals to 0, 1, 2, . . . , n−1, where n is a number of resource elements within a bandwidth part occupied by the PDSCH, and n is a positive integer, that is, each RE in the bandwidth part where the PDSCH is located is mapped with the DMRS.

In an implementation, for the first configuration type, the second frequency-domain mapping parameter k2 corresponding to the first device type equals to 4i+2k'+Δ, where k'=0, 1, i=0, 1, . . . , k2<=n, where n is the number of resource elements within the bandwidth part occupied by the PDSCH, and n is a positive integer.

For the first configuration type, the value of Δ can be seen in Table 1 below.

TABLE 1

| p | Orthogonal code division group number λ | Δ | $w_f$(k') k' = 0 | $w_f$(k') k' = 1 | $w_t$(l') l' = 0 | $w_t$(l') l' = 1 |
|---|---|---|---|---|---|---|
| 1000 | 0 | 0 | +1 | +1 | +1 | +1 |
| 1001 | 0 | 0 | +1 | −1 | +1 | +1 |
| 1002 | 1 | 1 | +1 | +1 | +1 | +1 |
| 1003 | 1 | 1 | +1 | −1 | +1 | +1 |
| 1004 | 0 | 0 | +1 | +1 | +1 | −1 |
| 1005 | 0 | 0 | +1 | −1 | +1 | −1 |
| 1006 | 1 | 1 | +1 | +1 | +1 | −1 |
| 1007 | 1 | 1 | +1 | −1 | +1 | −1 |

P is an antenna port, and λ is the orthogonal code division group number. Which antenna ports are available can be determined according to a number of antenna ports, and then the value of Δ of each antenna port can be determined.

Taking Δ=1 as an example, the second frequency-domain mapping parameter k2 corresponding to the first device type equals to 1, 3, 5, 7, . . . , 2n−1. That is, not every RE is mapped with the DMRS, but rather mapping at intervals is performed.

For different frequency-domain mapping parameters, corresponding $$N_{DMRS}^{PRB}$$

is also different, which will be explained in conjunction with FIG. 4 and FIG. 5 below.

FIG. 4 is schematic comparison diagram I of DMRS mapping provided by an embodiment of the present application. As shown in FIG. 4, an example of DMRS frequency-domain mapping patterns for two different device types under the DMRS configuration type 1 is illustrated. In this example, one resource block (RB), i.e., 12 REs in the schematic diagram, is taken as an example. A mapping pattern of at least one RB occupied by a PDSCH in the frequency domain is the same as a mapping pattern of a single RB in FIG. 4, and at the same time, a single-symbol DMRS mapping is illustrated in FIG. 4.

In FIG. 4, each square represents one RE, and the left part illustrates the frequency-domain mapping pattern of the DMRS for a legacy device, with a second frequency-domain mapping parameter k2=1, 3, 5, 7, . . . , 2n−1. That is, frequency-domain mapping locations k2 of the DMRS in one PRB equal to 1, 3, 5, 7, 9, 11. Then, according to the second frequency-domain mapping parameter k2, a number of REs occupied by the DMRS in each PRB can be obtained as 6, i.e., $$N_{DMRS}^{PRB}=6.$$

The right part of FIG. 4 illustrates the frequency-domain mapping pattern of the DMRS for a reduced-capability device, with a first frequency-domain mapping parameter k1=0, 1, 2, . . . , n−1. That is, each RE in the bandwidth part where the PDSCH is located is mapped with the DMRS. Therefore, according to the first frequency-domain mapping parameter k1, the number of REs occupied by the DMRS in each PRB can be obtained as 12, i.e., $$N_{DMRS}^{PRB}=12.$$

FIG. 5 is schematic comparison diagram II of DMRS mapping provided by an embodiment of the present application. As shown in FIG. 5, an example of DMRS frequency-domain mapping patterns for two different device types under the DMRS configuration type 1 is illustrated, where one RB has 12 REs, and a BWP includes at least one RB. Let a number of RBs in the BWP be N, then the number of REs is 12*N; at the same time, a dual-symbol DMRS mapping is illustrated in FIG. 5.

In FIG. 5, each square represents one RE, and the left part illustrates the frequency-domain mapping pattern of the DMRS for a legacy device, with a second frequency-domain mapping parameter k2=1, 3, 5, 7, . . . , 2n−1. That is, frequency-domain mapping locations k2 of the DMRS in one PRB equal to 1, 3, 5, 7, 9, 11. Then, according to the second frequency-domain mapping parameter k2, a number of REs occupied by the DMRS in each PRB can be obtained as 6, i.e., $$N_{DMRS}^{PRB}=6*2=12.$$

The right part of FIG. 5 illustrates the frequency-domain mapping pattern of the DMRS for a reduced-capability device, with a first frequency-domain mapping parameter k1=0, 1, 2, . . . , n−1. That is, each RE is mapped with the DMRS. Therefore, according to the first frequency-domain mapping parameter k1, the number of REs occupied by the DMRS in each PRB can be obtained as 12, i.e., $$N_{DMRS}^{PRB}=12*2=24.$$

According to the examples in FIG. 4 and FIG. 5, it can be seen that under the DMRS configuration type 1, in the single-symbol DMRS mapping or the dual-symbol DMRS mapping, $$N_{DMRS1}^{PRB}$$

obtained according to the first frequency-domain mapping parameter is twice as many as $$N_{DMRS2}^{PRB}$$

obtained according to the second frequency-domain mapping parameter, i.e., $$N_{DMRS1}^{PRB}=2N_{DMRS2}^{PRB}.$$

Let the number of available REs allocated to each PRB of the PDSCH for the reduced-capability device be $$N_{RE1}^{'},$$

the number of available REs allocated to each PRB of the PDSCH for the legacy device be $$N_{RE2}^{'},$$

then according to the above Formula (1), it can be obtained that:

$$N_{RE1}^{'}=N_{sc}^{RB}*N_{symb}^{sh}-N_{DMRS1}^{PRB}-N_{oh}^{PRB}$$

$$N_{RE2}^{'}=N_{sc}^{RB}*N_{symb}^{sh}-N_{DMRS2}^{PRB}-N_{oh}^{PRB}.$$

Since $$N_{DMRS1}^{PRB}=2N_{DMRS2}^{PRB},\ N_{RE1}^{'}\le N_{RE2}^{'}.$$

According to Formulas (2) to (7), it can be seen that the number $$N_{RE}'$$

of available REs allocated to each PRB of the PDSCH is positively correlated with the TBS. Therefore, the TBS can also be reduced by reducing the number of available REs allocated to each PRB of the PDSCH, which ensures that the TBS of the reduced-capability device in the present application is less than or equal to the TBS corresponding to the first device type.

In an implementation, for the second configuration type, the first frequency-domain mapping parameter k1 corresponding to the reduced-capability device equals to 4i+k'+Δ, where k1 is less than or equal to n, k' is 0 or 1, i is 0, 1, 2, . . . , and Δ is a positive integer greater than or equal to 0; n is a number of resource elements within a bandwidth part occupied by the PDSCH, n=N*12, N is a size of the bandwidth part occupied by the PDSCH, and n is a positive integer.

In an implementation, for the second configuration type, the second frequency-domain mapping parameter k2 corresponding to the first device type equals to 6i+k'+Δ, where k'=0, 1, k2 is less than or equal to n, i is 0, 1, 2, . . . , and Δ is a positive integer greater than or equal to 0; n is the number of resource elements within the bandwidth part occupied by the PDSCH, and n is a positive integer.

In an implementation, for the second configuration type, the value of Δ can be seen in Table 2 below.

TABLE 2

| p | Orthogonal code division group number λ | Δ | $w_f$ (k') k' = 0 | $w_f$ (k') k' = 1 | $w_t$ (l') l' = 0 | $w_t$ (l') l' = 1 |
|---|---|---|---|---|---|---|
| 1000 | 0 | 0 | +1 | +1 | +1 | +1 |
| 1001 | 0 | 0 | +1 | −1 | +1 | +1 |
| 1002 | 1 | 2 | +1 | +1 | +1 | +1 |
| 1003 | 1 | 2 | +1 | −1 | +1 | +1 |
| 1004 | 2 | 4 | +1 | +1 | +1 | +1 |
| 1005 | 2 | 4 | +1 | −1 | +1 | +1 |
| 1006 | 0 | 0 | +1 | +1 | +1 | −1 |
| 1007 | 0 | 0 | +1 | −1 | +1 | −1 |
| 1008 | 1 | 2 | +1 | +1 | +1 | −1 |
| 1009 | 1 | 2 | +1 | −1 | +1 | −1 |
| 1010 | 2 | 4 | +1 | +1 | +1 | −1 |
| 1011 | 2 | 4 | +1 | −1 | +1 | −1 |

P is an antenna port, and λ is the orthogonal code division group number. Which antenna ports are available can be determined according to a number of antenna ports, and then the value of Δ of each antenna port can be determined.

For different frequency-domain mapping parameters, corresponding $$N_{DMRS}^{PRB}$$

is also different, which will be explained in conjunction with FIG. 6 and FIG. 7 as follows.

Figures 6, 7:
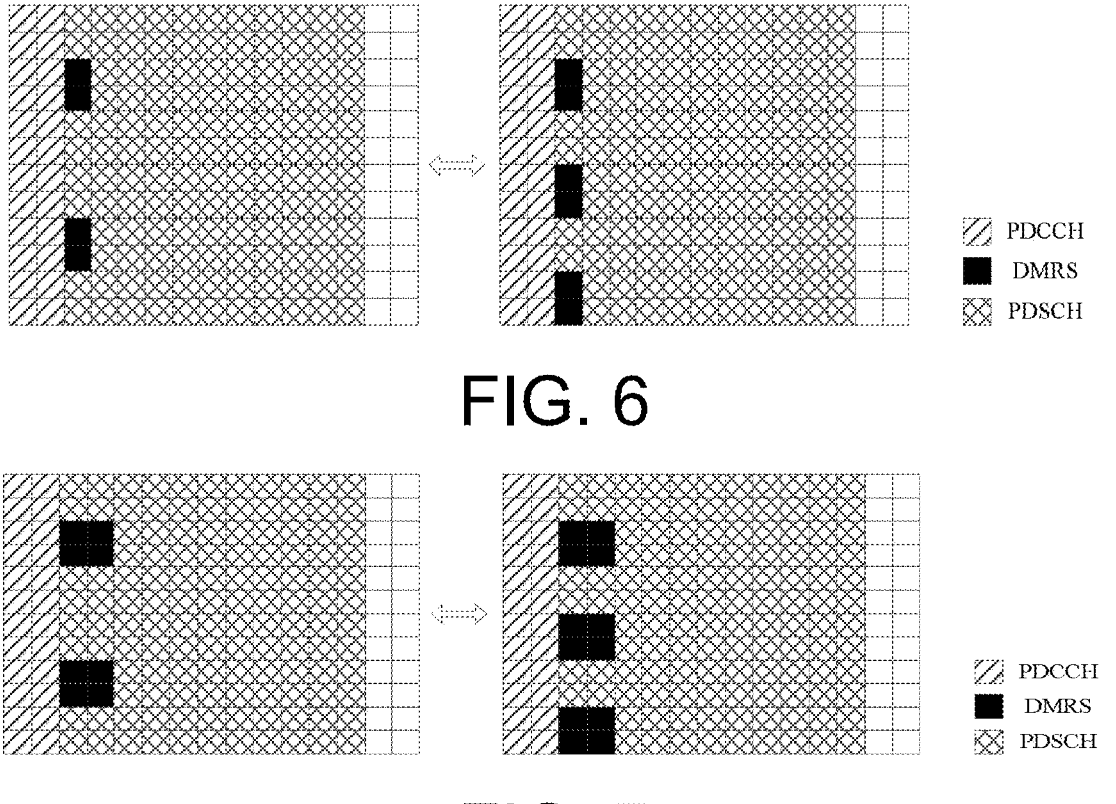
FIG. 6 is schematic comparison diagram III of DMRS mapping provided by an embodiment of the present application.
FIG. 7 is schematic comparison diagram IV of DMRS mapping provided by an embodiment of the present application.

FIG. 6 is schematic comparison diagram III of DMRS mapping provided by an embodiment of the present application. As shown in FIG. 6, an example of DMRS frequency-domain mapping patterns for two different device types under the DMRS configuration type 2 is illustrated. In this example, one RB is taken as an example, and a mapping pattern of at least one RB occupied by a PDSCH in the frequency domain is the same as a mapping pattern of a single RB. One RB includes 12 REs, and at the same time, a single-symbol DMRS mapping is illustrated in FIG. 6.

In FIG. 6, each square represents one RE, and the left part illustrates the frequency-domain mapping pattern of the DMRS for a legacy device, with a second frequency-domain mapping parameter k2=6i+k'+Δ. When Δ=2, frequency-domain mapping locations k2 of the DMRS in one PRB equal to 2, 3, 8, 9. Then, according to the second frequency-domain mapping parameter k2, the number of REs occupied by the DMRS in each PRB can be obtained as 4, i.e., $$N_{DMRS}^{PRB}=4.$$

The right part of FIG. 6 illustrates the frequency-domain mapping pattern of the DMRS for a reduced-capability device, with a first frequency-domain mapping parameter k1=4i+k'+Δ. When Δ=2, the frequency-domain mapping locations k1 of the DMRS in one PRB is equal to 2, 3, 6, 7, 10, 11. Therefore, according to the first frequency-domain mapping parameter k1, the number of REs occupied by the DMRS in each PRB can be obtained as 6, i.e., $$N_{DMRS}^{PRB}=6.$$

FIG. 7 is schematic comparison diagram III of DMRS mapping provided by an embodiment of the present application. As shown in FIG. 7, an example of DMRS frequency-domain mapping patterns for two different device types under the DMRS configuration type 2 is illustrated. In the example, one RB is taken as an example, and a mapping pattern of at least one RB occupied by a PDSCH in the frequency domain is the same as a mapping pattern of a single RB in FIG. 7. One RB includes 12 REs, and at the same time, a dual-symbol DMRS mapping is illustrated in FIG. 7.

In FIG. 7, each square represents one RE, and the left part illustrates the frequency-domain mapping pattern of the DMRS for a legacy device, with a second frequency-domain mapping parameter k2=6i+k'+Δ. When Δ=2, frequency-domain mapping locations k2 of the DMRS in one PRB is equal to 2, 3, 8, 9. Then, according to the second frequency-domain mapping parameter k2, a number of REs occupied by the DMRS in each PRB can be obtained as 4, i.e., $$N_{DMRS}^{PRB}=4*2=8.$$

The right part of FIG. 6 illustrates the frequency-domain mapping pattern of the DMRS for a reduced-capability device, with a first frequency-domain mapping parameter k1=4i+k'+Δ. When Δ=2, frequency-domain mapping locations k1 of the DMRS in one PRB equal to 2, 3, 6, 7, 10, 11. Therefore, according to the first frequency-domain mapping parameter k1, the number of REs occupied by the DMRS in each PRB can be obtained as 6, i.e., $$N_{DMRS}^{PRB}=6*2=12.$$

According to the examples in FIG. 6 and FIG. 7, it can be seen that under the DMRS configuration type 2, whether it is the single-symbol DMRS mapping or the dual-symbol DMRS mapping, $$N_{DMRS1}^{PRB}$$

obtained according to the first frequency-domain mapping parameter is twice as many as $$N_{DMRS2}^{PRB}$$

obtained according to the second frequency-domain mapping parameter, i.e., $$N_{DMRS1}^{PRB}\geq N_{DMRS2}^{PRB}.$$

Let the number of available REs allocated to each PRB of the PDSCH for the reduced-capability device be $$N'_{RE1},$$

the number of available REs allocated to each PRB of the PDSCH for the legacy device be $$N'_{RE2},$$

then according to the above Formula (1), it can be obtained that:

$$N'_{RE1} = N_{sc}^{RB} * N_{symb}^{sh} - N_{DMRS1}^{PRB} - N_{oh}^{PRB}$$

$$N'_{RE2} = N_{sc}^{RB} * N_{symb}^{sh} - N_{DMRS2}^{PRB} - N_{oh}^{PRB}.$$

Since $$N_{DMRS1}^{PRB} \geq N_{DMRS2}^{PRB}, N'_{RE1} \leq N'_{RE2}.$$

According to Formulas (2) to (7), it can be seen that the number $$N'_{RE}$$

of available REs allocated to each PRB of the PDSCH is positively correlated with the TBS. Therefore, the TBS can also be reduced by reducing the number of available REs allocated to each PRB of the PDSCH. That is, the TBS of the reduced-capability device in the present application is less than or equal to the TBS corresponding to the first device type. Meanwhile, since $$N_{DMRS}^{PRB}$$

is increased, channel estimation accuracy can be further improved, and decoding accuracy can be enhanced.

In the above embodiment, it is introduced that $N_{RE}$ can be reduced by means of the first radio resource overhead parameter and the first frequency-domain mapping parameter, thereby reducing the intermediate variable $N_{info}$, and achieving the purpose of reducing the maximum transport block size. According to Formula (3), it can be seen that in addition to being correlated to $N_{RE}$, the value of the intermediate variable $N_{info}$ is also correlated to the modulation strategy parameter $Q_m$ and the target code rate R. In the following, a solution of reducing the maximum transport block size according to the modulation strategy parameter $Q_m$ and the target code rate R will be introduced.

In an implementation, the cache information includes a first modulation and coding scheme parameter.

In an implementation, the first modulation and coding scheme parameter includes a first modulation strategy parameter and/or a first target code rate.

In an implementation, the first modulation strategy parameter and/or the first target code rate can be determined according to a modulation and coding scheme index.

In the embodiment of the present application, corresponding MCS mapping tables are set up for the reduced-capability device and the legacy device. If a network device identifies a terminal device type during random access, a corresponding MCS mapping table is adopted according to the terminal device type to determine the corresponding modulation strategy parameter and/or the target code rate. In an implementation, in addition to the MCS mapping table for the legacy device, both the terminal device and the network device have pre-stored a new MCS table, that is, a preset modulation and coding scheme list, which is used to determine the first modulation strategy parameter and/or the first target code rate for the reduced-capability device.

In an implementation, for any modulation and coding scheme index, the first modulation strategy parameter is less than or equal to a second modulation strategy parameter corresponding to the first device type.

In an implementation, for any modulation and coding scheme index, the first target code rate is less than or equal to a second target code rate corresponding to the first device type.

The following Table 3 illustrates a preset modulation and coding scheme list for the reduced-capability device, namely an MCS mapping table for the reduced-capability device.

TABLE 3

| Modulation and coding scheme index | First modulation strategy parameter $Q_m$ | First target code rate R |
|---|---|---|
| 0 | 2 | 50 |
| 1 | 2 | 64 |
| 2 | 2 | 78 |
| 3 | 2 | 99 |
| 4 | 2 | 120 |
| 5 | 2 | 157 |
| 6 | 2 | 193 |
| 7 | 2 | 251 |
| 8 | 2 | 308 |
| 9 | 2 | 379 |
| 10 | 4 | 340 |
| 11 | 4 | 378 |
| 12 | 4 | 434 |
| 13 | 4 | 490 |
| 14 | 4 | 553 |
| 15 | 4 | 616 |
| 16 | 4 | 658 |

The following Tables 4 to 6 illustrate preset modulation and coding scheme lists for the legacy device, namely MCS mapping tables for the legacy device.

TABLE 4

| Modulation and coding scheme index | Second modulation strategy parameter $Q_m$ | Second target code rate R |
|---|---|---|
| 0 | 2 | 120 |
| 1 | 2 | 157 |
| 2 | 2 | 193 |
| 3 | 2 | 251 |
| 4 | 2 | 308 |
| 5 | 2 | 379 |
| 6 | 2 | 449 |
| 7 | 2 | 526 |
| 8 | 2 | 602 |
| 9 | 2 | 679 |
| 10 | 4 | 340 |
| 11 | 4 | 378 |
| 12 | 4 | 434 |
| 13 | 4 | 490 |
| 14 | 4 | 553 |
| 15 | 4 | 616 |
| 16 | 4 | 658 |
| 17 | 6 | 438 |
| 18 | 6 | 466 |
| 19 | 6 | 517 |
| 20 | 6 | 567 |
| 21 | 6 | 616 |
| 22 | 6 | 666 |

TABLE 4-continued

| Modulation and coding scheme index | Second modulation strategy parameter $Q_m$ | Second target code rate R |
|---|---|---|
| 23 | 6 | 719 |
| 24 | 6 | 772 |
| 25 | 6 | 822 |
| 26 | 6 | 873 |
| 27 | 6 | 910 |
| 28 | 6 | 948 |
| 29 | 2 | 120 |
| 30 | 4 | 157 |
| 31 | 6 | 193 |

TABLE 5

| Modulation and coding scheme index | Second modulation strategy parameter $Q_m$ | Second target code rate R |
|---|---|---|
| 0 | 2 | 120 |
| 1 | 2 | 193 |
| 2 | 2 | 308 |
| 3 | 2 | 449 |
| 4 | 2 | 602 |
| 5 | 4 | 378 |
| 6 | 4 | 434 |
| 7 | 4 | 490 |
| 8 | 4 | 553 |
| 9 | 4 | 616 |
| 10 | 4 | 658 |
| 11 | 6 | 466 |
| 12 | 6 | 517 |
| 13 | 6 | 567 |
| 14 | 6 | 616 |
| 15 | 6 | 666 |
| 16 | 6 | 719 |
| 17 | 6 | 772 |
| 18 | 6 | 822 |
| 19 | 6 | 873 |
| 20 | 8 | 682.5 |
| 21 | 8 | 711 |
| 22 | 8 | 754 |
| 23 | 8 | 797 |
| 24 | 8 | 841 |
| 25 | 8 | 885 |
| 26 | 8 | 916.5 |
| 27 | 8 | 948 |
| 28 | 2 | |
| 29 | 4 | |
| 30 | 6 | |
| 31 | 8 | |

TABLE 6

| Modulation and coding scheme index | Second modulation strategy parameter $Q_m$ | Second target code rate R |
|---|---|---|
| 0 | 2 | 30 |
| 1 | 2 | 40 |
| 2 | 2 | 50 |
| 3 | 2 | 64 |
| 4 | 2 | 78 |
| 5 | 2 | 99 |
| 6 | 2 | 120 |
| 7 | 2 | 157 |
| 8 | 2 | 193 |
| 9 | 2 | 251 |
| 10 | 2 | 308 |
| 11 | 2 | 379 |
| 12 | 2 | 449 |
| 13 | 2 | 526 |
| 14 | 2 | 602 |
| 15 | 4 | 340 |
| 16 | 4 | 378 |
| 17 | 4 | 434 |
| 18 | 4 | 490 |

TABLE 6-continued

| Modulation and coding scheme index | Second modulation strategy parameter $Q_m$ | Second target code rate R |
|---|---|---|
| 19 | 4 | 553 |
| 20 | 4 | 616 |
| 21 | 6 | 438 |
| 22 | 6 | 466 |
| 23 | 6 | 517 |
| 24 | 6 | 567 |
| 25 | 6 | 616 |
| 26 | 6 | 666 |
| 27 | 6 | 719 |
| 28 | 6 | 772 |
| 29 | 2 | |
| 30 | 4 | |
| 31 | 6 | |

As shown in Tables 3 to 6, for any modulation and coding scheme index, the corresponding first modulation strategy parameter is less than or equal to the second modulation strategy parameter, and the corresponding first target code rate is less than or equal to the second target code rate. For example, when the modulation and coding scheme index is 5, it can be obtained from Table 1 that the first modulation strategy parameter is 2 and the first target code rate is 157, and it can be obtained from Table 3 that the second modulation strategy parameter is 4 and the second target code rate is 378, and so on.

Since the first modulation strategy parameter is less than or equal to the second modulation strategy parameter, and the first target code rate is less than or equal to the second target code rate, according to the above Formula (4), it can be seen that under the same $N_{RE}$, the intermediate variable $N_{info}$ corresponding to the reduced-capability device is less than or equal to the intermediate variable $N_{info}$ corresponding to the legacy device; and the intermediate variable $N_{info}$ is positively correlated with the maximum transport block size, so the first maximum transport block size of the reduced-capability device is less than or equal to the second maximum transport block size of the legacy device. Therefore, it can be obtained that the Layer 1 buffer size of the reduced-capability device is less than or equal to the Layer 1 buffer size of the legacy device.

In the above embodiment, the solution of reducing $N_{info}$ by means of at least one of the first radio resource overhead parameter, the first frequency-domain mapping parameter and the first modulation and coding scheme parameter and thus reducing the TBS is introduced. In the following, a solution of modifying a calculation formula for $N_{info}$ by means of the first scaling factor and thus reducing the TBS will be introduced.

In an implementation, the cache information also includes the first scaling factor, and the first maximum transport block size is determined according to at least one of the number of available resource elements, the first modulation and coding scheme parameter and the first scaling factor.

In an implementation, for the terminal device of the first device type, the intermediate variable $N_{info}=N_{RE}*R*Q_m*v$ or $N_{info}=S2*N_{RE}*R*Q_m*v$. In an implementation, when a channel carrying service data is any one of a physical downlink shared channel scrambled with a cell radio network temporary identifier, a physical downlink shared channel scrambled with a modulation coding scheme cell radio network temporary identifier, a physical downlink shared channel scrambled with a temporary cell radio network temporary identifier, a physical downlink shared channel scrambled with a configured scheduling radio network temporary identifier, or a physical downlink shared channel scrambled with a system information radio network temporary identifier, $N_{info}=N_{RE}*R*Q_m*v$; when the channel carrying the service data is a physical downlink shared channel scrambled with a paging radio network temporary identifier or a physical downlink shared channel scrambled with a random access radio network temporary identifier, $N_{info}=S2*N_{RE}*R*Q_m*v$, where S2 is a second scaling factor, and a value of S2 can be determined according to Table 7.

TABLE 7

| Transport block scaling field | Second scaling factor S2 |
|---|---|
| 00 | 1 |
| 01 | 0.5 |
| 10 | 0.25 |
| 11 | |

In an implementation, for the reduced-capability device, a calculation formula for the intermediate variable $N_{info}$ is as follows:

$$N_{info}=S1*N_{RE}*R*Q_m*v. \quad (9)$$

In an implementation, a channel carrying service data includes at least one of the following: a physical downlink shared channel scrambled with a cell radio network temporary identifier, a physical downlink shared channel scrambled with a modulation coding scheme cell radio network temporary identifier, a physical downlink shared channel scrambled with a temporary cell radio network temporary identifier, a physical downlink shared channel scrambled with a configured scheduling radio network temporary identifier, a physical downlink shared channel scrambled with a system information radio network temporary identifier, a physical downlink shared channel scrambled with a paging radio network temporary identifier, or a physical downlink shared channel scrambled with a random access radio network temporary identifier. S1 is the first scaling factor, and the value of S1 can be determined according to Table 8.

TABLE 8

| Transport block scaling field | First scaling factor S1 |
|---|---|
| 00 | 1 |
| 01 | 0.5 |
| 10 | 0.25 |
| 11 | 0.4 |

When the channel carrying the service data is any one of the physical downlink shared channel scrambled with the cell radio network temporary identifier, the physical downlink shared channel scrambled with the modulation coding scheme cell radio network temporary identifier, the physical downlink shared channel scrambled with the temporary cell radio network temporary identifier, the physical downlink shared channel scrambled with the configured scheduling radio network temporary identifier, or the physical downlink shared channel scrambled with the system information radio network temporary identifier, the second scaling factor S2 for the first device type is equal to 1, while the first scaling factor S1 is less than or equal to 1. Therefore, the first scaling factor is less than or equal to the second scaling factor, and the first maximum transport block size is less than or equal to the second maximum transport block size. Therefore, it can be obtained that the Layer 1 buffer size of the reduced-capability device is less than or equal to the Layer 2 buffer size of the legacy device.

When the channel carrying service data is the physical downlink shared channel scrambled with the paging radio network temporary identifier or the physical downlink shared channel scrambled with the random access radio network temporary identifier, the second scaling factor for the first device type can be seen in Table 7, while the first scaling factor for the reduced-capability device can be seen in Table 8. For any transport block scaling field (transport block scaling field), the corresponding first scaling factor is less than or equal to the second scaling factor, and thus the first maximum transport block size is less than or equal to the second maximum transport block size. Therefore, it can be obtained that the Layer 1 buffer size of the reduced-capability device is less than or equal to the Layer 1 buffer size of the legacy device.

In summary, in the embodiment of the present application, by extending an application scope of the first scaling factor and determining the intermediate variable $N_{info}$ by means of the first scaling factor when the channel carrying the service data is any one of the physical downlink shared channel scrambled with the cell radio network temporary identifier, the physical downlink shared channel scrambled with the modulation coding scheme cell radio network temporary identifier, the physical downlink shared channel scrambled with the temporary cell radio network temporary identifier, the physical downlink shared channel scrambled with the configured scheduling radio network temporary identifier, or the physical downlink shared channel scrambled with the system information radio network temporary identifier, the intermediate variable $N_{info}$, for both of them is determined by the first scaling factor, and the intermediate variable $N_{info}$ of the second device type is reduced compared to the intermediate variable $N_{info}$ of the first device type, and thus the first maximum transport block size is less than or equal to the second maximum transport block size. Therefore, it can be obtained that the Layer 1 buffer size of the reduced-capability device is less than or equal to the Layer 1 buffer size of the legacy device. That is, the Layer 1 buffer size is reduced by means of the first scaling factor, thereby reducing the buffer size of the reduced-capability device.

In the above embodiment, the solution of reducing the Layer 1 buffer size by reducing the maximum transport block size is introduced. The buffer of the terminal device includes the Layer 1 buffer and/or the Layer 2 buffer. In an implementation, the Layer 2 buffer size is positively correlated with a data rate, and the Layer 2 buffer size can be reduced by reducing the data rate. In an implementation, a calculation formula for the data rate is as follows:

$$\text{data rate (in Mbps)} = 10^{-6}*\sum_{j=1}^{J}\left(v_{Layers}^{(j)}*Q_m^{(j)}*f^{(j)}*R_{max}-\frac{N_{PRB}^{BW(j)*\mu}}{T_s^{\mu}}-\left(1-OH^{(j)}\right)\right).$$

In the embodiment of the present application, $$v_{Layers}^{(j)}$$

is a maximum layer number supported by a physical downlink shared channel or a physical uplink shared channel;

$$Q_m^{(j)}$$

is a maximum modulation order supported by the physical downlink shared channel or the physical uplink shared channel; $f^{(i)}$ is a scaling factor specified by a high-level parameter scalingFactor; $R_{max}$=948/1024; TS is an average duration of an OFDM symbol in one subframe; μ is a subcarrier spacing; $BW^{(j)}$ is a maximum bandwidth part supported in a given frequency band;

$$N_{PRB}^{BW(j)*\mu}$$

is a maximum RB allocation number of the bandwidth part $BW^{(j)}$ with the subcarrier spacing being μ; and $OH^{(j)}$ is an overhead factor.

In an implementation, the value of $f^{(j)}$ can be limited to belonging to {0.1, 0.2, 0.3, 0.15}, or the value of $f^{(j)}$ can be limited to a value that conforms to a preset rule, such as values with a step size of 0.1 and no more than 0.5 (i.e., the value of $f^{(j)}$ belongs to {0.1, 0.2, 0.3, 0.4, 0.5}) or values that conform to other preset rules.

In an implementation, a product of $$v_{Layers}^{(j)} * Q_m^{(j)} * f^{(j)}$$

is other values less than 4. For example, the product of $$v_{Layers}^{(j)} * Q_m^{(j)} * f^{(j)}$$

is less than a preset fixed value or the product of $$v_{Layers}^{(j)} * Q_m^{(j)} * f^{(j)}$$

is a value that satisfies a preset rule, such as $2^{-1}$=0.5, $2^1$=2, and the like.

In an implementation, the value of the product of $$v_{Layers}^{(j)} * Q_m^{(j)} * f^{(j)}$$

may also be related to a subcarrier spacing of the physical downlink shared channel or a subcarrier spacing of the physical uplink shared channel. Specifically, $$v_{Layers}^{(j)} * Q_m^{(j)} * f^{(j)} = X/(2^\wedge u),$$

where u is the subcarrier spacing of the physical downlink shared channel or the subcarrier spacing of the physical uplink shared channel, and X is the product of $$v_{Layers}^{(j)} * Q_m^{(j)} * f^{(j)}$$

when the subcarrier spacing is 15 KHz. For example, when the subcarrier spacing of the physical downlink shared channel or the subcarrier spacing of the physical uplink shared channel is 15 KHz, $$v_{Layers}^{(j)} * Q_m^{(j)} * f^{(j)} = X,$$

then when the subcarrier spacing of the physical downlink shared channel or the subcarrier spacing of the physical uplink shared channel is 30 KHz, $$v_{Layers}^{(j)} * Q_m^{(j)} * f^{(j)} = X/2.$$

The data rate can be reduced by reducing $f^{(j)}$ and limiting the product of $$v_{Layers}^{(j)} * Q_m^{(j)} * f^{(j)},$$

thereby reducing the Layer 2 buffer size, and ultimately achieving the purpose of reducing the Layer 2 buffer size of the terminal device.

Figure 8:
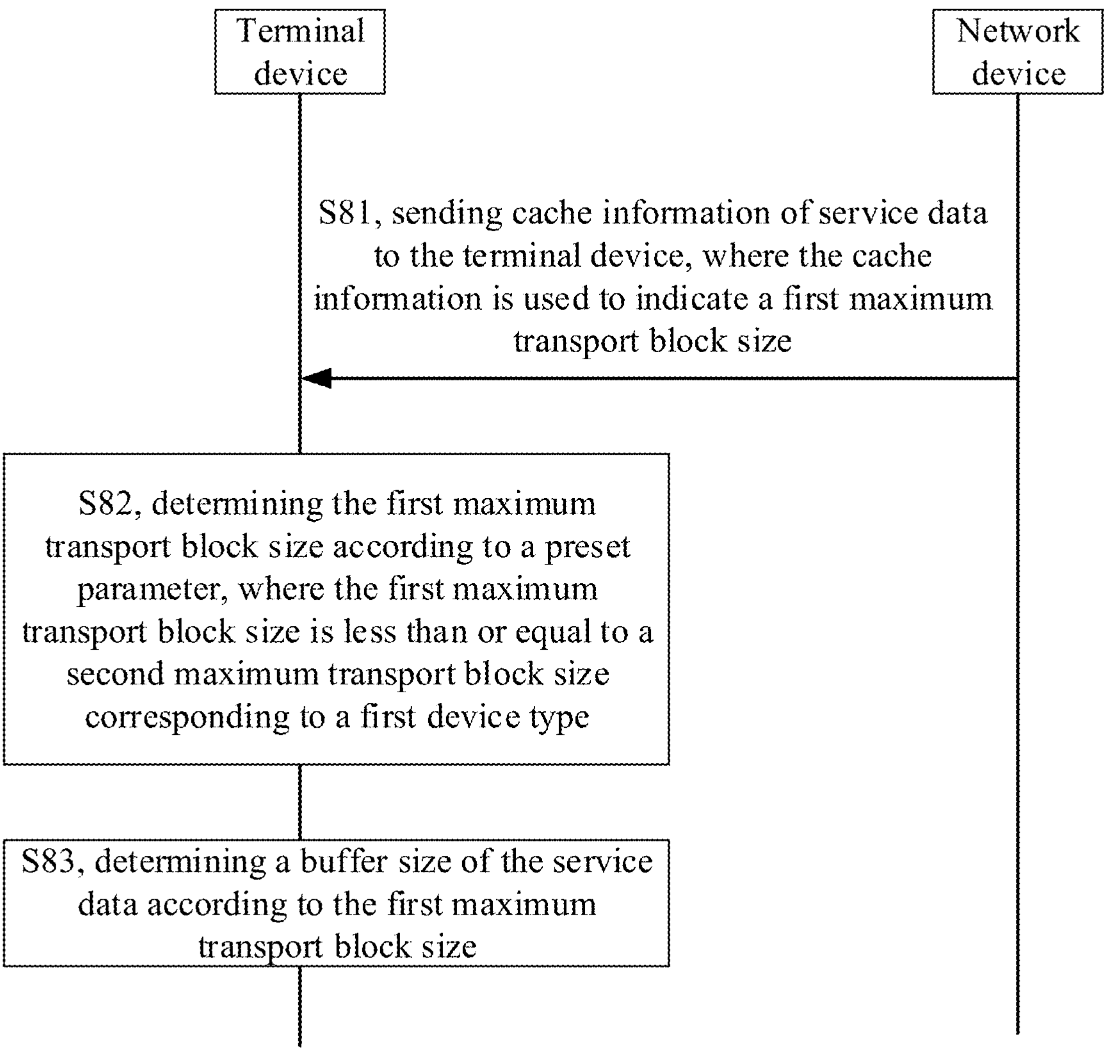
FIG. 8 is signaling diagram II of a processing method provided by an embodiment of the present application.

FIG. 8 is signaling diagram II of a processing method provided by an embodiment of the present application. As shown in FIG. 8, the method can be applied to a terminal device, and includes the following steps.

S81, a network device sends a preset parameter of service data to the terminal device.

The network device can be a device used to communicate with the terminal device. For example, the network device may be: a base station in a GSM) or CDMA communication system; or a base station in a WCDMA system; or an evolutionary base station in an LTE system. Or, the network device may be a relay station, an access point, an onboard device, a wearable device, a network side device in a future 5G network or a network after 5G, or a network device in a future evolving PLMN network.

The network device involved in the embodiment of the present application may also be referred to as an RAN device. The RAN device is connected to the terminal device to receive data from the terminal device and send data to a core network device. The RAN device corresponds to a different device in a different communication system. For example, the RAN device corresponds to a base station and a base station controller in a 2G system, corresponds to a base station and an RNC in a 3G system, corresponds to an evolutionary base station in a 4G system, corresponds to an access network devices (such as a gNB, a CU, a DU) of a 5G system (such as NR) in the 5G system.

The network device can send the preset parameter to the terminal device.

S82, determining the first maximum transport block size according to a preset parameter, where the first maximum transport block size is less than or equal to a second maximum transport block size corresponding to a first device type.

The terminal device in the embodiment of the present application may be either a legacy device or a reduced-capability device.

In an implementation, the terminal device in the embodiment of the present application is a reduced-capability device, and a device of the first device type is a legacy device. The first maximum transport block size of the terminal device can be determined according to the preset parameter. The first maximum transport block size is less than or equal to a maximum transport block size corresponding to the first device type, that is, the first maximum transport block size is less than or equal to the maximum transport block size corresponding to the legacy device.

S83, determining a buffer size of the service data according to the first maximum transport block size.

In an implementation, a buffer size of the service data includes a Layer 1 buffer size of the service data and/or a Layer 2 buffer size, where the Layer 1 buffer size is positively correlated with the maximum transport block size of the terminal device. In the embodiment of the present application, the first maximum transport block size of the terminal device is less than or equal to the maximum transport block size corresponding to the first device type. Therefore, the Layer 1 buffer size of the terminal device is less than or equal to the Layer 1 buffer size corresponding to the first device type, thereby the buffer size of the service data of the terminal device is less than or equal to the buffer size of the service data corresponding to the first device type.

A calculation process of the maximum transport block size of the terminal device can be found in the above Formulas (1) to (8), and then the Layer 1 buffer size can be determined according to the maximum transport block size. In an implementation, the above solution of calculating the maximum transport block size is applicable to the terminal device of the first device type, i.e., the legacy device, and is also applicable to the terminal device of a second device type, i.e., the reduced-capability device.

Formulas (6) to (8) illustrate a calculation method for the maximum transport block size under different code rates R and different values of $$N'_{info}.$$

According to Formulas (6) to (8), it can be seen that TBS and $$N'_{info}$$

are positively correlated, that is, the larger the $$N'_{info},$$

the larger the TBS; otherwise, the smaller the $$N'_{info},$$

the smaller the TBS.

Formulas (4) and (5) illustrate a calculation method for $$N'_{info}$$

under different value ranges of $N_{info}$. According to Formulas (4) and (5), it can be seen that $$N'_{info}$$

and $N_{info}$ are also positively correlated, that is, the larger the $N_{info}$, the larger the $$N'_{info};$$

otherwise, the smaller the $N_{info}$, the smaller the $$N'_{info}.$$

Formula (3) illustrates that the magnitude of $N_{info}$ is correlated with $N_{RE}$, R, $Q_m$ and so on. In summary, it can be concluded that the TBS could be reduced by reducing values of $N_{RE}$, R, and $Q_m$, thereby achieving a purpose of reducing the buffer size of the terminal device; and that the TBS could also be reduced by modifying the calculation formula of $N_{info}$ in the Formula (3), thereby achieving the purpose of reducing the buffer size of the terminal device.

In the embodiment of the present application, the first maximum transport block size can be determined according to the preset parameter. In an implementation, the preset parameter includes at least one of a number of available resource elements in each PRB of the PDSCH, a first modulation and coding scheme parameter and a first scaling factor. In an implementation, the value of $N_{RE}$ can be reduced by means of the number of available resource elements in each PRB of the PDSCH; the values of R and $Q_m$ can be reduced by means of the first modulation and coding scheme parameter; the calculation formula of $N_{info}$ can be modified on the basis of Formula (3) by means of the first scaling factor to reduce $N_{info}$. That is, by means of various parameters in the preset parameter, the purpose of reducing the TBS and thus reducing the buffer size of the terminal device can be achieved. In the following, the parameters in the preset parameter will be introduced respectively.

In an implementation, a determining manner for the number of available resource elements in each PRB of the PDSCH is: determining the number of available resource elements in each PRB of the PDSCH according to a first radio resource overhead parameter and/or a first frequency-domain mapping parameter, and then determining the first maximum transport block size according to at least one of the number of available resource elements, the first modulation and coding scheme parameter and the first scaling factor.

In an implementation, the first radio resource overhead parameter is a radio resource overhead parameter of the reduced-capability device.

In an implementation, the first radio resource overhead parameter is greater than or equal to a radio resource overhead parameter of the first device type.

It can be seen according to Formula (1) that, the number $$N'_{RE}$$

of available REs allocated to each PRB of the PDSCH can be obtained according to the radio resource overhead parameter $$N_{oh}^{PRB}.$$

Let the first radio resource overhead parameter be $$N_{oh1}^{PRB},$$

the second radio resource overhead parameter of the first device type be $$N_{oh2}^{PRB},$$

then the number of available REs allocated to each PRB of the PDSCH can be obtained as follows:

$$N'_{RE1} = N_{sc}^{RB} * N_{symb}^{sh} - N_{DMRS}^{PRB} - N_{oh1}^{PRB}$$

$$N'_{RE2} = N_{sc}^{RB} * N_{symb}^{sh} - N_{DMRS}^{PRB} - N_{oh2}^{PRB}.$$

In an implementation, $$N'_{RE1}$$

is the number of available REs allocated to each PRB of the PDSCH corresponding to the reduced-capability device, and $$N'_{RE2}$$

is the number of available REs allocated to each PRB of the PDSCH corresponding to the legacy device. Since $$N_{oh1}^{PRB} \geq N_{oh2}^{PRB}, N'_{RE1} \leq N'_{RE2}.$$

That is, compared to the terminal device of the first device type, in the embodiment of the present application, the number of available REs allocated to each PRB of the PDSCH is reduced by increasing the value of the radio resource overhead parameter. According to Formulas (2) to (7), it can be seen that the number $$N'_{RE}$$

of available REs allocated to each PRB of the PDSCH is positively correlated with the TBS. Therefore, the TBS can also be reduced by reducing the number of available REs allocated to each PRB of the PDSCH. That is, the TBS of the reduced-capability device in the present application is less than or equal to the TBS corresponding to the first device type.

In an implementation, the value of the first radio resource overhead parameter includes at least one of the following: 0, 6, 12, 18, 30, that is, the first radio resource overhead parameter xOverload-redcap $\in$ {xOh0, xOh6, xOh12, xOh18, xOh30}.

In an implementation, the value of the second radio resource overhead parameter includes at least one of the following: 0, 6, 12, that is, the second radio resource overhead parameter xOverhead $\in$ {xOh0, xOh6, xOh12}.

Through increasing the radio resource overhead parameter, the maximum transport block size is reduced, so that the first maximum transport block size is less than or equal to the second maximum transport block size, thereby reducing the buffer size of the reduced-capability device and reducing a waste of hardware resources.

In the above embodiment, it is introduced that $$N'_{RE}$$

is reduced by setting the first radio resource overhead parameter, and thus $N_{RE}$ is reduced, thereby achieving the purpose of reducing TBS. In the following, a solution of reducing the TBS by means of the frequency-domain mapping parameter will be introduced.

The frequency-domain mapping parameter is used to indicate an RE location occupied by a DMRS in each PRB. Since a configuration type of the demodulation reference signal includes a first configuration type (i.e., a DRMS configuration type 1) and a second configuration type (i.e., a DRMS configuration type 2), corresponding frequency-domain mapping parameters are also different for different configuration types.

In an implementation, for the first configuration type, the first frequency-domain mapping parameter k1 corresponding to the reduced-capability device equals to 0, 1, 2, . . . , n−1, where n is a number of resource elements within a bandwidth part occupied by the PDSCH, and n is a positive integer. That is, each RE in the bandwidth part where the PDSCH is located is mapped with the DMRS.

In an implementation, for the first configuration type, the second frequency-domain mapping parameter k2 corresponding to the first device type equals to 4i+2k'+Δ, where k'=0, 1. In an implementation, for the first configuration type, the value of Δ can be seen in Table 1.

Taking Δ=1 as an example, the second frequency-domain mapping parameter k2 corresponding to the first device type equals 1, 3, 5, 7, . . . , 2n−1, where n is the number of resource elements within the bandwidth part occupied by the PDSCH, and n is a positive integer. That is, not every RE is mapped with the DMRS, but rather mapping at intervals is performed.

For different frequency-domain mapping parameters, corresponding $$N_{DMRS}^{PRB}$$

is also different, which will be explained in conjunction with FIG. 4 and FIG. 5 as follows.

As shown in FIG. 4, an example of DMRS frequency-domain mapping patterns for two different device types under the DMRS configuration type 1 is illustrated. In this example, one RB is taken as an example, and a mapping pattern of at least one RB occupied by a PDSCH in the frequency domain is the same as a mapping pattern of a single RB. One RB includes 12 REs, and at the same time, a single-symbol DMRS mapping is illustrated in FIG. 4.

In FIG. 4, each square represents one RE, and the left part illustrates the frequency-domain mapping pattern of the DMRS for a legacy device, with a second frequency-domain mapping parameter k2=1, 3, 5, 7, . . . , 2n−1. That is, frequency-domain mapping locations k2 of the DMRS in one PRB equal to 1, 3, 5, 7, 9, 11. Then, according to the second frequency-domain mapping parameter k2, a number of REs occupied by the DMRS in each PRB can be obtained as 6, i.e., $$N_{DMRS}^{PRB} = 6.$$

The right part of FIG. 4 illustrates the frequency-domain mapping pattern of the DMRS for a reduced-capability device, with a first frequency-domain mapping parameter k1=0, 1, 2, . . . , n−1. That is, each RE in the bandwidth part where the PDSCH is located is mapped with the DMRS. Therefore, according to the first frequency-domain mapping parameter k1, the number of REs occupied by the DMRS in each PRB can be obtained as 12, i.e., $$N_{DMRS}^{PRB} = 12.$$

As shown in FIG. 5, an example of DMRS frequency-domain mapping patterns for two 25 different device types under the DMRS configuration type 1 is illustrated, where one RB has 12 REs, and a BWP includes at least one RB. Let the number of RBs in the BWP be N, then the number of REs is 12*N; at the same time, a dual-symbol DMRS mapping is illustrated in FIG. 5.

In FIG. 5, each square represents one carrier, and the left part illustrates the frequency-domain mapping pattern of the DMRS for a legacy device, with a second frequency-domain mapping parameter k2=1, 3, 5, 7, . . . . That is, frequency-domain mapping locations k2 of the DMRS in one PRB equal to 1, 3, 5, 7, 9, 11. Then, according to the second frequency-domain mapping parameter k2, a number of REs occupied by the DMRS in each PRB can be obtained as 6, i.e., $$N_{DMRS}^{PRB} = 6 * 2 = 12.$$

The right part of FIG. 5 illustrates the frequency-domain mapping pattern of the DMRS for a reduced-capability device, with a first frequency-domain mapping parameter k1=0, 1, 2, . . . n−1. That is, each RE is mapped with the DMRS. Therefore, according to the first frequency-domain mapping parameter k1, the number of REs occupied by the DMRS in each PRB can be obtained as 12, i.e., $$N_{DMRS}^{PRB} = 12 * 2 = 24.$$

According to the examples in FIG. 4 and FIG. 5, it can be seen that under the DMRS configuration type 1, whether it is the single-symbol DMRS mapping or the dual-symbol DMRS mapping, $$N_{DMRS1}^{PRB}$$

obtained according to the first frequency-domain mapping parameter is twice as many as $$N_{DMRS2}^{PRB}$$

obtained according to the second frequency-domain mapping parameter, i.e., $$N_{DMRS1}^{PRB} = 2N_{DMRS2}^{PRB}.$$

Let the number of available REs allocated to each PRB of the PDSCH for the reduced-capability device be $$N'_{RE1},$$

the number of available REs allocated to each PRB of the PDSCH for the legacy device be $$N'_{RE2},$$

then according to the above Formula (1), it can be obtained that:

$$N'_{RE1} = N_{sc}^{RB} * N_{symb}^{sh} - N_{DMRS1}^{PRB} - N_{oh}^{PRB}$$
$$N'_{RE2} = N_{sc}^{RB} * N_{symb}^{sh} - N_{DMRS2}^{PRB} - N_{oh}^{PRB}.$$

Since $$N_{DMRS1}^{PRB} = 2N_{DMRS2}^{PRB}, N'_{RE1} \le N'_{RE2}.$$

According to Formulas (2) to (7), it can be seen that the number $N_{RE}$ of available REs allocated to each PRB of the PDSCH is positively correlated with the TBS. Therefore, the TBS can be reduced by reducing the number of available REs allocated to each PRB of the PDSCH. That is, the TBS of the reduced-capability device in the present application is less than or equal to the TBS corresponding to the first device type.

In an implementation, for the second configuration type, the first frequency-domain mapping parameter k1 corresponding to the reduced-capability device equals to 4i+k'+Δ, where k1 is less than or equal to n, k' is 0 or 1, i is 0, 1, 2, . . . , and A is a positive integer greater than or equal to 0; n is the number of resource elements within a bandwidth part occupied by the PDSCH, n=N*12, N is a size of the bandwidth part occupied by the PDSCH, and n is a positive integer.

In an implementation, for the second configuration type, the second frequency-domain mapping parameter k2 corresponding to the first device type equals to 6i+k'+Δ, where k'=0, 1, k2 is less than or equal to n, i is 0, 1, 2, . . . , and A is a positive integer greater than or equal to 0; n is the number of resource elements within the bandwidth part occupied by the PDSCH, and n is a positive integer. In an implementation, for the second configuration type, the value of Δ can be seen in Table 2.

For different frequency-domain mapping parameters, corresponding $$N_{DMRS}^{PRB}$$

is also different, which will be explained in conjunction with FIG. 6 and FIG. 7 as follows.

As shown in FIG. 6, an example of DMRS frequency-domain mapping patterns for two different device types under the DMRS configuration type 2 is illustrated. In this example, one RB is taken as an example, and a mapping pattern of at least one RB occupied by a PDSCH in the frequency domain is the same as a mapping pattern of a single RB. One RB includes 12 REs, and at the same time, a single-symbol DMRS mapping is illustrated in FIG. 6.

In FIG. 6, each square represents one RE, and the left part illustrates the frequency-domain mapping pattern of the DMRS for a legacy device, with a second frequency-domain mapping parameter k2=6i+k'+Δ. When Δ=2, k2=2, 3, 8, 9, and then according to the second frequency-domain mapping parameter k2, the number of REs occupied by the DMRS in each PRB can be obtained as 4, i.e., $$N_{DMRS}^{PRB}=4.$$

The right part of FIG. 6 illustrates the frequency-domain mapping pattern of the DMRS for a reduced-capability device, with a first frequency-domain mapping parameter k1=4i+k'+Δ. When Δ=2, k1=2, 3, 6, 7, 10, 11. Therefore, according to the first frequency-domain mapping parameter k1, the number of REs occupied by the DMRS in each PRB can be obtained as 6, i.e., $$N_{DMRS}^{PRB}=6.$$

As shown in FIG. 7, an example of DMRS frequency-domain mapping patterns for two 15 different device types under the DMRS configuration type 2 is illustrated. In this example, one RB is taken as an example, and a mapping pattern of at least one RB occupied by a PDSCH in the frequency domain is the same as a mapping pattern of a single RB. One RB includes 12 REs, and at the same time, a dual-symbol DMRS mapping is illustrated in FIG. 7.

In FIG. 7, each square represents one RE, and the left part illustrates the frequency-domain mapping pattern of the DMRS for a legacy device, with a second frequency-domain mapping parameter k2=6i+k'+Δ. When Δ=2, i.e., k2=2, 3, 8, 9, according to the second frequency-domain mapping parameter k2, the number of REs occupied by the DMRS in each PRB can be obtained as 4, i.e., $$N_{DMRS}^{PRB}=4*2=8.$$

The right part of FIG. 7 illustrates the frequency-domain mapping pattern of the DMRS for a reduced-capability device, with a first frequency-domain mapping parameter k1=4i+k'+Δ. When Δ=2, k1=2, 3, 6, 7, 10, 11. Therefore, according to the first frequency-domain mapping parameter k1, the number of REs occupied by the DMRS in each PRB can be obtained as 6, i.e., $$N_{DMRS}^{PRB}=6*2=12.$$

According to the examples in FIG. 6 and FIG. 7, it can be seen that under the DMRS configuration type 2, whether it is the single-symbol DMRS mapping or the dual-symbol DMRS mapping, $$N_{DMRS1}^{PRB}$$

obtained according to the first frequency-domain mapping parameter is twice as many as $$N_{DMRS2}^{PRB}$$

obtained according to the second frequency-domain mapping parameter, i.e., $$N_{DMRS1}^{PRB}\geq N_{DMRS2}^{PRB}.$$

Let the number of available REs allocated to each PRB of the PDSCH for the reduced-capability device be $$N'_{RE1},$$

the number of available REs allocated to each PRB of the PDSCH for the legacy device be $$N'_{RE2},$$

then according to the above Formula (1), it can be obtained that:

$$N'_{RE1}=N_{sc}^{RB}*N_{symb}^{sh}-N_{DMRS1}^{PRB}-N_{oh}^{PRB}$$

$$N'_{RE2}=N_{sc}^{RB}*N_{symb}^{sh}-N_{DMRS2}^{PRB}-N_{oh}^{PRB}.$$

Since $$N_{DMRS1}^{PRB}\geq N_{DMRS2}^{PRB},\ N'_{RE1}\leq N'_{RE2}.$$

According to Formulas (2) to (7), it can be seen that the number $N'_{RE}$ of available REs allocated to each PRB of the PDSCH is positively correlated with the TBS. Therefore, the TBS can be reduced by reducing the number of available REs allocated to each PRB of the PDSCH. That is, the TBS of the reduced-capability device in the present application is less than or equal to the TBS corresponding to the first device type. Meanwhile, since $$N_{DMRS}^{PRB}$$

is increased, channel estimation accuracy can be further improved, and decoding accuracy can be enhanced.

In the above embodiment, it is introduced that $N_{RE}$ can be reduced by means of the first radio resource overhead parameter and the first frequency-domain mapping parameter, thereby reducing the intermediate variable $N_{info}$, and achieving the purpose of reducing the maximum transport block size. According to Formula (3), it can be seen that in addition to being correlated to $N_{RE}$, the value of the intermediate variable $N_{info}$ is also correlated to the modulation strategy parameter $Q_m$ and the target code rate R. In the following, a solution of reducing the maximum transport block size according to the modulation strategy parameter $Q_m$ and the target code rate R will be introduced.

In an implementation, the first modulation and coding scheme parameter includes a first modulation strategy parameter and/or a first target code rate.

In an implementation, the first modulation strategy parameter and/or the first target code rate can be determined according to a modulation and coding scheme index.

In the embodiment of the present application, corresponding MCS mapping tables are set up for the reduced-capability device and the legacy device. If a network device identifies a terminal device type during random access, a corresponding MCS mapping table is adopted according to the terminal device type to determine the corresponding modulation strategy parameter and/or the target code rate. In an implementation, in addition to the MCS mapping table for the legacy device, both the terminal device and the network device have pre-stored a new MCS table, that is, a preset modulation and coding scheme list, which is used to determine the first modulation strategy parameter and/or the first target code rate for the reduced-capability device.

In an implementation, for any modulation and coding scheme index, the first modulation strategy parameter is less than or equal to a second modulation strategy parameter corresponding to the first device type.

In an implementation, for any modulation and coding scheme index, the first target code rate is less than or equal to a second target code rate corresponding to the first device type.

Table 3 illustrates a preset modulation and coding scheme list for the reduced-capability device, which is an MCS mapping table for the reduced-capability device. Tables 4 to 6 illustrate preset modulation and coding scheme lists for the legacy device, which are MCS mapping tables for the legacy device. As shown in Tables 3 to 6, for any modulation and coding scheme index, the corresponding first modulation strategy parameter is less than or equal to the second modulation strategy parameter, and the corresponding first target code rate is less than or equal to the second target code rate. For example, when the modulation and coding scheme index is 5, it can be obtained from Table 3 that the first modulation strategy parameter is 2 and the first target code rate is 157, and it can be obtained from Table 5 that the second modulation strategy parameter is 4 and the second target code rate is 378, and so on.

Since the first modulation strategy parameter is less than or equal to the second modulation strategy parameter, and the first target code rate is less than or equal to the second target code rate, according to the above Formula (4), it can be seen that under the same $N_{RE}$, the intermediate variable $N_{info}$ corresponding to the reduced-capability device is less than or equal to the intermediate variable $N_{info}$ corresponding to the legacy device; and the intermediate variable $N_{info}$ is positively correlated with the maximum transport block size, so the first maximum transport block size of the reduced-capability device is less than or equal to the second maximum transport block size of the legacy device. Therefore, it can be obtained that the Layer 1 buffer size of the reduced-capability device is less than or equal to the Layer 1 buffer size of the legacy device.

In the above embodiment, the solution of reducing $N_{info}$ by means of at least one of the first radio resource overhead parameter, the first frequency-domain mapping parameter and the first modulation and coding scheme parameter and thus reducing the TBS is introduced. In the following, a solution of reducing $N_{info}$ by modifying a calculation formula for $N_{info}$ by means of the first scaling factor and thus reducing the TBS will be introduced.

In an implementation, the preset parameter also includes the first scaling factor, and the first maximum transport block size is determined according to at least one of the number of available resource elements, the first modulation and coding scheme parameter and the first scaling factor.

In an implementation, for the terminal device of the first device type, the intermediate variable $N_{info}=N_{RE}*R*Q_m*v$ or $N_{info}=S2*N_{RE}*R*Q_m*v$. In an implementation, when a channel carrying the service data is any one of a physical downlink shared channel scrambled with a cell radio network temporary identifier, a physical downlink shared channel scrambled with a modulation coding scheme cell radio network temporary identifier, a physical downlink shared channel scrambled with a temporary cell radio network temporary identifier, a physical downlink shared channel scrambled with a configured scheduling radio network temporary identifier, or a physical downlink shared channel scrambled with a system information radio network temporary identifier, $N_{info}=N_{RE}*R*Q_m*v$; when the channel carrying the service data is a physical downlink shared channel scrambled with a paging radio network temporary identifier or a physical downlink shared channel scrambled with a random access radio network temporary identifier, $N_{info}=S2*N_{RE}*R*Q_m*v$, where S2 is a second scaling factor, and a value of S2 can be determined according to Table 7.

In an implementation, for the reduced-capability device, a calculation formula for the intermediate variable $N_{info}$ is as follows:

$$N_{info}=S1*N_{RE}*R*Q_m*v.$$

In an implementation, the channel carrying the service data includes at least one of the following: a physical downlink shared channel scrambled with a cell radio network temporary identifier, a physical downlink shared channel scrambled with a modulation coding scheme cell radio network temporary identifier, a physical downlink shared channel scrambled with a temporary cell radio network temporary identifier, a physical downlink shared channel scrambled with a configured scheduling radio network temporary identifier, a physical downlink shared channel scrambled with a system information radio network temporary identifier, a physical downlink shared channel scrambled with a paging radio network temporary identifier, or a physical downlink shared channel scrambled with a random access radio network temporary identifier. S1 is the first scaling factor, and the value of S1 can be determined according to Table 8.

When the channel carrying the service data is any one of the physical downlink shared channel scrambled with the cell radio network temporary identifier, the physical downlink shared channel scrambled with the modulation coding scheme cell radio network temporary identifier, the physical downlink shared channel scrambled with the temporary cell radio network temporary identifier, the physical downlink shared channel scrambled with the configured scheduling radio network temporary identifier, or the physical downlink shared channel scrambled with the system information radio network temporary identifier, the second scaling factor S2 for the first device type is equal to 1, while the first scaling factor S1 is less than or equal to 1. Therefore, the first scaling factor is less than or equal to the second scaling factor, and the first maximum transport block size is less than or equal to the second maximum transport block size. Therefore, it can be obtained that the Layer 1 buffer size of the reduced-capability device is less than or equal to the Layer 1 buffer size of the legacy device.

When the channel carrying the service data is the physical downlink shared channel scrambled with the paging radio network temporary identifier or the physical downlink shared channel scrambled with the random access radio network temporary identifier, the second scaling factor for the first device type can be seen in Table 7, while the first scaling factor for the reduced-capability device can be seen in Table 8. For any transport block scaling field, the corresponding first scaling factor is less than or equal to the second scaling factor, and thus the first maximum transport block size is less than or equal to the second maximum transport block size. Therefore, it can be obtained that the Layer 1 buffer size of the reduced-capability device is less than or equal to the Layer 1 buffer size of the legacy device.

In summary, in the embodiment of the present application, by extending an application scope of the first scaling factor and determining the intermediate variable $N_{info}$ by means of the first scaling factor when the channel carrying the service data is any one of the physical downlink shared channel scrambled with the cell radio network temporary identifier, the physical downlink shared channel scrambled with the modulation coding scheme cell radio network temporary identifier, the physical downlink shared channel scrambled with the temporary cell radio network temporary identifier, the physical downlink shared channel scrambled with the configured scheduling radio network temporary identifier, or the physical downlink shared channel scrambled with the system information radio network temporary identifier, the intermediate variable $N_{info}$ is reduced compared to the first device type, and thus the first maximum transport block size is less than or equal to the second maximum transport block size. Therefore, it can be obtained that the Layer 1 buffer size of the reduced-capability device is less than or equal to the Layer 1 buffer size of the legacy device. That is, the Layer 1 buffer size is reduced by means of the first scaling factor, thereby reducing the buffer size of the reduced-capability device.

In the embodiment of the present application, the value of $f^{(j)}$ is limited to belonging to {0.1, 0.2, 0.3, 0.15}, or the value of $f^{(j)}$ is limited to a value that conforms to a preset rule, such as values with a step size of 0.1 and no more than 0.5 (i.e., the value of $f^{(j)}$ belongs to {0.1, 0.2, 0.3, 0.4, 0.5}) or values that conform to other preset rules. A product of $$v_{Layers}^{(j)} * Q_m^{(j)} * f^{(j)}$$

limited to be other values less than 4. For example, the product is less than a preset value or is a value satisfying a preset rule, such as $2^{-1}=0.5$, $2^{1}=2$, and the like. The data rate can be reduced by reducing $f^{(j)}$ and limiting the product of $$v_{Layers}^{(j)} * Q_m^{(j)} * f^{(j)},$$

thereby reducing the Layer 2 buffer size, and ultimately achieving the purpose of reducing the buffer size of the terminal device.

Figure 9:
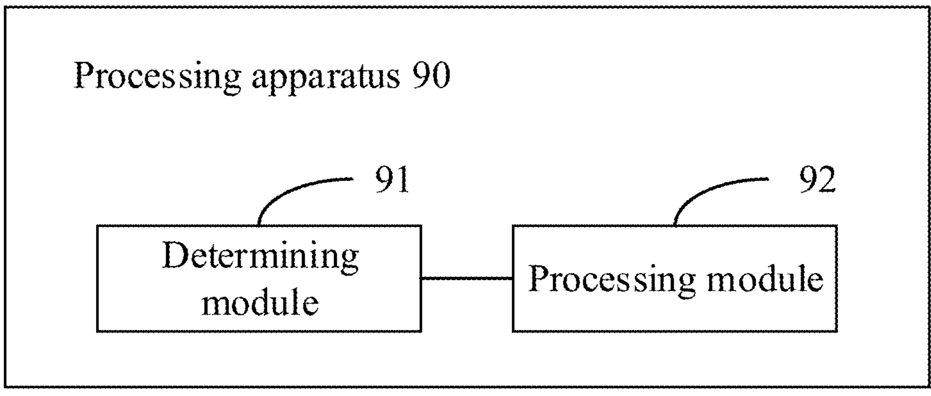
FIG. 9 is schematic structural diagram I of a processing apparatus provided by an embodiment of the present application.

FIG. 9 is schematic structural diagram I of a processing apparatus provided by an embodiment of the present application. As shown in FIG. 9, the processing apparatus 90 includes:

a determining module 91, configured to determine a first maximum transport block size according to cache information of service data, where the first maximum transport block size is less than or equal to a second maximum transport block size corresponding to a first device type;

a processing module 92, configured to determine a buffer size of the service data according to the first maximum transport block size.

In an implementation, the cache information includes at least one of the following:

a first radio resource overhead parameter;

a first frequency-domain mapping parameter;

a first modulation and coding scheme parameter;

a first scaling factor.

In an implementation, the method further includes at least one of the following:

the first radio resource overhead parameter is greater than or equal to a second radio resource overhead parameter of the first device type;

a value of the first radio resource overhead parameter includes at least one of the following: 0, 6, 12, 18, 30;

if a configuration type of a demodulation reference signal is a first configuration type, then the first frequency-domain mapping parameter k=0, 1, 2, . . . , n−1, where n is the number of resource elements within a bandwidth part occupied by a physical downlink shared channel, and n is a positive integer;

if the configuration type of the demodulation reference signal is a second configuration type, then the first frequency-domain mapping parameter k=4i+k'+Δ, where k is less than or equal to n, k' is 0 or 1, i is 0, 1, 2, . . . , and A is a positive integer greater than or equal to 0;

the first modulation and coding scheme parameter includes a first modulation strategy parameter and/or a first target code rate;

the first scaling factor is less than or equal to a second scaling factor corresponding to the first device type;

the first scaling factor includes at least one of the following: 1, 0.5, 0.25, 0.4.

In an implementation, for any modulation and coding scheme index, the first modulation strategy parameter is less than or equal to a second modulation strategy parameter corresponding to the first device type; and/or, the first target code rate is less than or equal to a second target code rate corresponding to the first device type.

In an implementation, the determining module is specifically configured to:

determine the number of available resource elements in each physical resource block of a physical downlink shared channel according to the first radio resource overhead parameter and/or the first frequency-domain mapping parameter;

determine the first maximum transport block size according to at least one of the number of available resource elements, the first modulation and coding scheme parameters and the first scaling factor.

In an implementation, a channel carrying the service data includes at least one of the following:

a physical downlink shared channel scrambled with a cell radio network temporary identifier;

a physical downlink shared channel scrambled with a modulation coding scheme cell radio network temporary identifier;

a physical downlink shared channel scrambled with a temporary cell radio network temporary identifier;

a physical downlink shared channel scrambled with a configured scheduling radio network temporary identifier;

a physical downlink shared channel scrambled with a system information radio network temporary identifier;

a physical downlink shared channel scrambled with a paging radio network temporary identifier;

a physical downlink shared channel scrambled with a random access radio network temporary identifier.

In an implementation, the buffer size includes:

a Layer 1 buffer size of the service data and/or a Layer 2 buffer size of the service data.

The processing apparatus provided by the embodiment of the present application can execute technical solutions shown in the above method embodiments, and their implementation principles and beneficial effects are similar, which will not be elaborated here.

Figure 10:
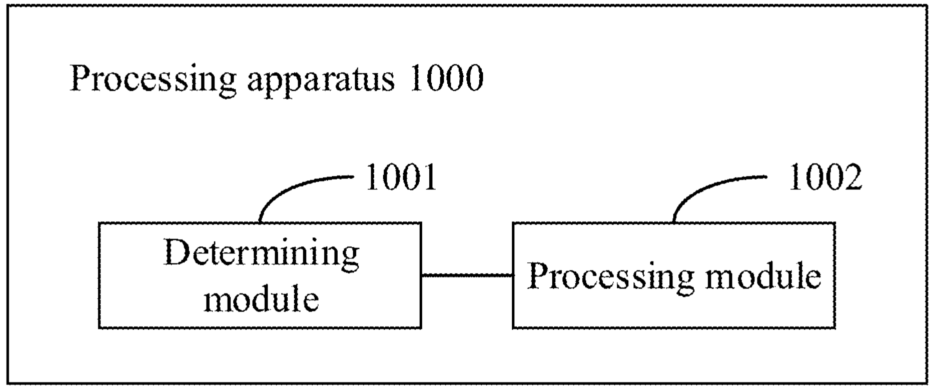
FIG. 10 is schematic structural diagram II of a processing apparatus provided by an embodiment of the present application.

FIG. 10 is schematic structural diagram II of a processing apparatus provided by an embodiment of the present application. As shown in FIG. 10, the processing apparatus 1000 includes:

a determining module 1001, configured to determine a first maximum transport block size according to a preset parameter, where the first maximum transport block size is less than or equal to a second maximum transport block size corresponding to a first device type;

a processing module 1002, configured to determine a buffer size of service data according to the first maximum transport block size.

In an implementation, the preset parameter includes at least one of the following:

the number of available resource elements in each physical resource block of a physical downlink shared channel;

a first modulation and coding scheme parameter;

a first scaling factor.

In an implementation, a determination manner of the number of available resource elements in each physical resource block of the physical downlink shared channel is:

determining the number of available resource elements in each physical resource block of the physical downlink shared channel according to a first radio resource overhead parameter and/or a first frequency-domain mapping parameter.

In an implementation, the method further includes at least one of the following:

the first radio resource overhead parameter is greater than or equal to a second radio resource overhead parameter of the first device type;

a value of the first radio resource overhead parameter includes at least one of the following: 0, 6, 12, 18, 30;

if a configuration type of a demodulation reference signal is a first configuration type, then the first frequency-domain mapping parameter $k=0, 1, 2, \ldots, n-1$, where n is the number of resource elements within a bandwidth part occupied by a physical downlink shared channel, and n is a positive integer;

if the configuration type of the demodulation reference signal is a second configuration type, then the first frequency-domain mapping parameter $k=4i+k'+\Delta$, where k is less than or equal to n, k' is 0 or 1, i is 0, 1, 2, . . . , and $\Delta$ is a positive integer greater than or equal to 0;

the first modulation and coding scheme parameter includes a first modulation strategy parameter and/or a first target code rate;

the first scaling factor is less than or equal to a second scaling factor corresponding to the first device type;

the first scaling factor includes at least one of the following: 1, 0.5, 0.25, 0.4.

In an implementation, for any modulation and coding scheme index, the first modulation strategy parameter is less than or equal to a second modulation strategy parameter corresponding to the first device type; and/or, the first target code rate is less than or equal to a second target code rate corresponding to the first device type.

In an implementation, a channel carrying the service data includes at least one of the following:

a physical downlink shared channel scrambled with a cell radio network temporary identifier;

a physical downlink shared channel scrambled with a modulation coding scheme cell radio network temporary identifier;

a physical downlink shared channel scrambled with a temporary cell radio network temporary identifier;

a physical downlink shared channel scrambled with a configured scheduling radio network temporary identifier;

a physical downlink shared channel scrambled with a system information radio network temporary identifier;

a physical downlink shared channel scrambled with a paging radio network temporary identifier;

a physical downlink shared channel scrambled with a random access radio network temporary identifier.

In an implementation, the buffer size includes:

a Layer 1 buffer size of the service data and/or a layer 2 buffer size of the service data.

The processing apparatus provided by the embodiment of the present application can execute technical solutions shown in the above method embodiments, and their implementation principles and beneficial effects are similar, which will not be elaborated here.

Figure 11:
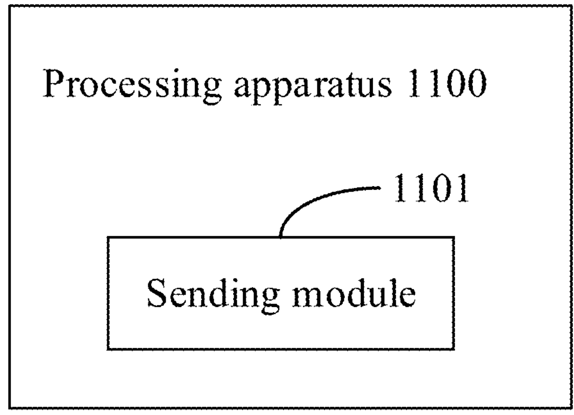
FIG. 11 is schematic structural diagram III of a processing apparatus provided by an embodiment of the present application.

FIG. 11 is schematic structural diagram III of a processing apparatus provided by an embodiment of the present application. As shown in FIG. 11, the processing apparatus 1100 includes:

a sending module 1101, configured to send cache information of service data to a terminal device, where the cache information is used to indicate a first maximum transport block size, and the first maximum transport block size is less than or equal to a second maximum transport block size corresponding to a first device type.

In an implementation, the cache information includes at least one of the following:

a first radio resource overhead parameter;

a first frequency-domain mapping parameter;

a first modulation and coding scheme parameter;

a first scaling factor.

In an implementation, the method further includes at least one of the following:

the first radio resource overhead parameter is greater than or equal to a second radio resource overhead parameter of the first device type;

a value of the first radio resource overhead parameter includes at least one of the following: 0, 6, 12, 18, 30;

if a configuration type of a demodulation reference signal is a first configuration type, then the first frequency-domain mapping parameter k=0, 1, 2, . . . , n−1, where n is the number of resource elements within a bandwidth part occupied by a physical downlink shared channel, and n is a positive integer;

if the configuration type of the demodulation reference signal is a second configuration type, then the first frequency-domain mapping parameter $k=4i+k'+\Delta$, where k is less than or equal to n, k' is 0 or 1, i is 0, 1, 2, . . . , and $\Delta$ is a positive integer greater than or equal to 0;

the first modulation and coding scheme parameter includes a first modulation strategy parameter and/or a first target code rate;

the first scaling factor is less than or equal to a second scaling factor corresponding to the first device type;

the first scaling factor includes at least one of the following: 1, 0.5, 0.25, 0.4.

In an implementation, for any modulation and coding scheme index, the first modulation strategy parameter is less than or equal to a second modulation strategy parameter corresponding to the first device type; and/or, the first target code rate is less than or equal to a second target code rate corresponding to the first device type.

In an implementation, the first radio resource overhead parameter and/or the first frequency-domain mapping parameter are used to determine the number of available resource elements in each physical resource block of a physical downlink shared channel, and at least one of the number of available resource elements, the first modulation and coding scheme parameter and the first scaling factor are used to determine the first maximum transport block size.

In an implementation, a channel carrying the service data includes at least one of the following:

a physical downlink shared channel scrambled with a cell radio network temporary identifier;

a physical downlink shared channel scrambled with a modulation coding scheme cell radio network temporary identifier;

a physical downlink shared channel scrambled with a temporary cell radio network temporary identifier;

a physical downlink shared channel scrambled with a configured scheduling radio network temporary identifier;

a physical downlink shared channel scrambled with a system information radio network temporary identifier;

a physical downlink shared channel scrambled with a paging radio network temporary identifier;

a physical downlink shared channel scrambled with a random access radio network temporary identifier.

The processing apparatus provided by the embodiment of the present application can execute technical solutions shown in the above method embodiments, and their implementation principles and beneficial effects are similar, which will not be elaborated here.

Figure 12:
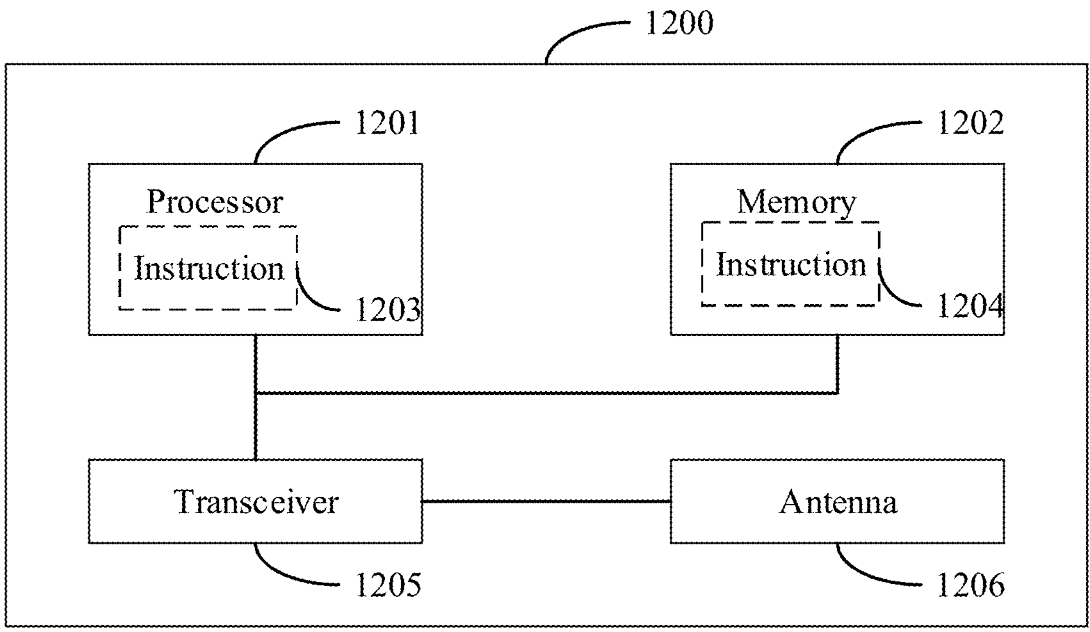
FIG. 12 is a schematic structural diagram of a communication device provided by an embodiment of the present application.

FIG. 12 is a schematic structural diagram of a communication device provided by an embodiment of the present application. As shown in FIG. 12, the communication device 1200 described in this embodiment can be a terminal device (or components that can be used for the terminal device) or a network device (or components that can be used for the network device) mentioned in the above method embodiments. The communication device 1200 can be used to implement methods corresponding to the terminal device or the network device that are described in the above method embodiments, and details could be found in the above method embodiments.

The communication device 1200 can include one or more processors 1201. The processor 1201 may also be referred to as a processing unit, and can achieve certain control or processing functions. The processor 1201 may be a general-purpose processor or a specialized processor, etc. For example, the processor 1201 may be a baseband processor or a central processor. The baseband processor can be used to process communication specifications and communication data, while the central processor can be used to control the communication device, execute software programs and process software program data.

In an implementation, the processor 1201 may also store instructions 1203 or data (e.g., intermediate data). In an implementation, the instructions 1203 can be run by the processor 1201, enabling the communication device 1200 to execute the methods corresponding to the terminal device or the network device that are described in the above method embodiments. In an implementation, the communication device 1200 may include a circuit that can achieve functions of sending, receiving or communicating in the above method embodiments. In an implementation, the communication device 1200 may include one or more memories 1202, on which instructions 1204 may be stored. The instructions 1204 can be run on the processor 1201, enabling the communication device 1200 to execute the methods described in the above method embodiments. In an implementation, data can also be stored in the memory 1202. The processor 1201 and the memory 1202 can be disposed separately or integrated together. In an implementation, the communication device 1200 may also include a transceiver 1205 and/or an antenna 1206. The processor 1201 may be referred to as a processing unit, for controlling the communication device 1200 (a terminal device, a core network device, or a wireless access network device). The transceiver 1205 may be referred to as a transceiving unit, a transmitter-receiver, a transceiving circuit, or a transceiver, etc., for achieving a transceiving function of the communication device 1200. In an implementation, a specific implementation process of the processor 1201 and the transceiver 1205 can be seen in relevant descriptions of the above embodiments, which will not be elaborated here.

The processor 1201 and the transceiver 1205 described in the present application can be implemented on an integrated circuit (IC), an analog integrated circuit, an radio frequency integrated circuit (RFIC), a mixed signal integrated circuit, an application specific integrated circuit (ASIC), a printed circuit board (PCB), an electronic device, etc. The processor 1201 and the transceiver 1205 may also be manufactured using various integrated circuit process technologies, such as complementary metal oxide semiconductor (CMOS), N metal-oxide-semiconductor (NMOS), positive channel metal oxide semiconductor (PMOS), bipolar junction transistor (BJT), bipolar CMOS (BiCMOS), silicon germanium (SiGe), gallium arsenide (GaAs), etc.

In the present application, the communication device can be the terminal device or the network device (e.g., a base station), which needs to be determined according to context. In addition, the terminal device can be implemented in various forms. For example, the terminal device described in the present application may include mobile terminals such as a mobile phone, a tablet, a laptop, a handheld computer, a personal digital assistant (PDA), a portable media player (PMP), a navigation apparatus, a wearable device, a smart wristband, a pedometer, etc., and fixed terminals such as a digital TV, a desktop computer, etc. Although the communication device is described by using the terminal device or the network device as an example in the description of the above embodiments, a scope of the communication device described in the present application is not limited to the above terminal device or network device, and a structure of the communication device may not be limited by FIG. 12. The communication device can be an independent device or can be a part of a larger device.

An embodiment of the present application also provides a communication system, including: the terminal device as described in any one of the above method embodiments; and the network device as described in in any one of the above method embodiments.

An embodiment of the present application also provides a terminal device. The terminal device includes a memory and a processor; where the memory stores a computer program, and steps of the processing method described in any one of the above embodiments are implemented when the computer program is executed by the processor.

An embodiment of the present application also provides a network device. The network device includes a memory and a processor; where the memory stores a computer program, and steps of the processing method described in any one of the above embodiments are implemented when the computer program is executed by the processor.

An embodiment of the present application also provides a computer-readable storage medium. The storage medium stores a computer program, and steps of the processing method described in any one of the above embodiments are implemented when the computer program is executed by a processor.

In the embodiments of terminal devices, network devices and computer-readable storage media provided by the present application, all technical features of any one of the above processing method embodiments can be included. Expanded and explained content in the specification is basically the same as the above method embodiments, which will not be elaborated here.

An embodiment of the present application also provides a computer program product. The computer program product includes computer program code, and when the computer program code is executed on a computer, the computer is caused to execute the methods in the above various possible embodiments.

An embodiment of the application also provides a chip, including a memory and a processor, where the memory is used to store a computer program, and the processor is used to call and run the computer program from the memory, so that a device installed with the chip can execute the methods in the above various possible embodiments as described above.

The above serial numbers of embodiments of the present application are for descriptive purposes only, and do not represent advantages or disadvantages of the embodiments. The steps in the methods of the embodiments of the present application may be adjusted in terms of the order, merged and deleted according to actual requirements. The units in the devices of the embodiments of the present application may be combined, divided and deleted according to the actual requirements. In the present application, same or similar terminology concepts, technical solutions and/or application scenarios are generally described in detail only at a first occurrence, and they are generally not repeated again for the sake of conciseness when occurring again later. In understanding the contents of the technical solutions of the present application and the like, for the same or similar terminology concepts, technical solutions and/or application scenarios that are not described in detail later on, please refer to previous relevant detailed descriptions thereof. In the present application, the descriptions of respective embodiments have their own emphasis, and for parts that are not described or documented in detail in a certain embodiment, the relevant descriptions of other embodiments can be referred to. Technical features of the technical solutions of the present application can be combined in any way, and for the sake of conciseness of the description, not all possible combinations of the technical features in the above embodiments are described. However, as long as there is no contradiction in a combination of the technical features, they should be considered to be within the scope of the present application.

Through the above description of the embodiments, it is clear to those skilled in the art that the methods in the above embodiments can be realized with an aid of software plus a necessary general hardware platform, or of course, through hardware, but in many cases the former is the better way of implementation. Based on this understanding, the technical solution of the present application essentially, or a portion that contributes to the prior art, may be embodied in a form of a software product, which is stored in a storage medium (e.g., a ROM/RAM, a disk, an optical disk) as described above, and includes a number of instructions to enable a terminal device (which may be a mobile phone, a computer, a server, a controlled terminal, or a network device, etc.) to execute the method in each of the embodiments of the present application. The above embodiments may be implemented in whole or in part by software, hardware, firmware, or any combination thereof. When implemented using the software, it may be implemented, in whole or in part, in the form of the computer program product. The computer program product includes one or more computer instructions. When the computer program instructions are loaded and executed on the computer, a process or function according to embodiments of the present application is produced in whole or in part. The computer may be a general-purpose computer, a specialized computer, a computer network, or other programmable apparatuses. The computer instructions may be stored in a computer-readable storage medium, or transmitted from one computer-readable storage medium to another computer-readable storage medium, e.g., the computer instructions may be transmitted by wire (e.g., coaxial cables, optical fibers, digital subscriber lines) or wirelessly (e.g., in an infrared manner, wirelessly, in microwaves, etc.) from one website, computer, server or data center to another website, computer, server or data center. The computer-readable storage medium may be any available medium that the computer can access or a data storage device such as a server, a data center or the like that contains one or more available media integrated. The available medium may be a magnetic medium (e.g., a floppy disk, a memory disk, a tape), an optical medium (e.g., a DVD), or a semiconductor medium (e.g., a solid state storage disk Solid State Disk (SSD)), etc.

The above are merely preferred embodiments of the present application, and are not intended to limit the patent scope of the present application. Any equivalent structure or equivalent process transformation utilizing the contents of the specification and the accompanying drawings of the present application, or direct or indirect application thereof in other related technical fields, are all similarly included in the patent protection scope of the present application.

What is claimed is:

1. A processing method, wherein the method comprises:

determining a first maximum transport block size according to at least one of a first radio resource overhead parameter or a first frequency-domain mapping parameter in cache information of service data, the first maximum transport block size is less than or equal to a second maximum transport block size corresponding to a first device type;

wherein the first radio resource overhead parameter is negatively correlated with the first maximum transport block size, and the first frequency-domain mapping parameter is negatively correlated with the first maximum transport block size;

determining a size of a first buffer of the service data according to the first maximum transport block size, and determining a size of a second buffer of the service data according to a maximum data rate, wherein at least one of the first buffer or the second buffer is less than a buffer corresponding to a first device type, and the first buffer is a Layer 1 buffer, the second buffer is a Layer 2 buffer;

wherein the method further comprises:

when a type of a terminal device is a reduced-capability device, determining a preset modulation and coding scheme (MCS) list for the reduced-capacity device, determining a first MCS parameter according to the preset MCS list, wherein the first MCS parameter comprises at least one of a first modulation strategy parameter or a first target code rate;

calculating an intermediate variable according to a first scaling factor, wherein the intermediate variable $N_{info}=S1*N_{RE}*R*Q_m*v$; wherein $N_{info}$ is used for all service types, the intermediate variable $N_{info}$ is used to calculate a transport block size, and the intermediate variable $N_{info}$ is positively correlated with the transport block size; wherein $N_{info}$ is the intermediate variable, S1 is the first scaling factor, R is a first target code rate determined according to a MCS index, $Q_m$ is a first modulation strategy parameter determined according to the MCS index, and $N_{RE}$ is a total number of available resource elements.

2. The method according to claim 1, wherein the method further comprises at least one of the following:

the first radio resource overhead parameter is greater than or equal to a second radio resource overhead parameter of the first device type;

a value of the first radio resource overhead parameter comprises at least one of the following: 0, 6, 12, 18, 30;

if a configuration type of a demodulation reference signal is a first configuration type, then the first frequency-domain mapping parameter k=0, 1, 2, . . . , n−1, wherein n is the number of resource elements within a bandwidth part occupied by a physical downlink shared channel, and n is a positive integer;

if the configuration type of the demodulation reference signal is a second configuration type, then the first frequency-domain mapping parameter $k=4i+k'+\Delta$, wherein k is less than or equal to n, k' is 0 or 1, i is 0, 1, 2, . . . , and $\Delta$ is a positive integer greater than or equal to 0;

the first MCS parameter comprises at least one of a first modulation strategy parameter or a first target code rate;

the first scaling factor is less than or equal to a second scaling factor corresponding to the first device type;

the first scaling factor comprises at least one of the following: 1, 0.5, 0.25, 0.4.

3. The method according to claim 2, wherein for any modulation and coding scheme index, at least one of the following is met:

the first modulation strategy parameter is less than or equal to a second modulation strategy parameter corresponding to the first device type; or the first target code rate is less than or equal to a second target code rate corresponding to the first device type.

4. The method according to claim 1, wherein the determining the first maximum transport block size according to at least one of the first radio resource overhead parameter or the first frequency-domain mapping parameter in the cache information of the service data, comprising comprises:

determining the number of available resource elements in each physical resource block of a physical downlink shared channel according to at least one of the first radio resource overhead parameter or the first frequency-domain mapping parameter;

determining the first maximum transport block size according to at least one of the number of available resource elements, the first modulation and coding scheme parameter and the first scaling factor.

5. The method according to claim 1, wherein a channel carrying the service data comprises at least one of the following:

a physical downlink shared channel scrambled with a cell radio network temporary identifier;

a physical downlink shared channel scrambled with a modulation coding scheme cell radio network temporary identifier;

a physical downlink shared channel scrambled with a temporary cell radio network temporary identifier;

a physical downlink shared channel scrambled with a configured scheduling radio network temporary identifier;

a physical downlink shared channel scrambled with a system information radio network temporary identifier;

a physical downlink shared channel scrambled with a paging radio network temporary identifier;

a physical downlink shared channel scrambled with a random access radio network temporary identifier.

6. A communication device, comprising: a memory and a processor;

the memory is configured to store program instructions;

the processor is configured to call the program instructions in the memory to execute the processing method according to claim 1.

7. A non-transitory computer-readable storage medium, wherein the storage medium has a computer program stored thereon, and when the computer program is executed, the processing method according to claim 1 is implemented.

8. A processing method, wherein the method comprises:

sending cache information of service data to a terminal device, wherein the cache information is used to indicate a first maximum transport block size, and the first maximum transport block size is determined according to at least one of a first radio resource overhead parameter or a first frequency-domain mapping parameter in the cache information; wherein the first radio resource overhead parameter is negatively correlated with the first maximum transport block size, and the first frequency-domain mapping parameter is negatively correlated with the first maximum transport block size;

determining a size of a first buffer of the service data according to the first maximum transport block size, and determining a size of a second buffer of the service data according to a maximum data rate, wherein at least one of the first buffer or the second buffer is less than a buffer corresponding to a first device type, and the first buffer is a Layer 1 buffer, the second buffer is a Layer 2 buffer;

wherein the method further comprises:

when a type of a terminal device is a reduced-capability device, determining a preset modulation and coding scheme (MCS) list for the reduced-capacity device, determining a first MCS parameter according to the preset MCS list, wherein the first MCS parameter comprises at least one of a first modulation strategy parameter or a first target code rate;

calculating an intermediate variable according to a first scaling factor, wherein the intermediate variable $N_{info}$=S1*$N_{RE}$*R*$Q_m$*v; wherein $N_{info}$ is used for all service types, the intermediate variable $N_{info}$ is used to calculate a transport block size, and the intermediate variable $N_{info}$ is positively correlated with the transport block size; wherein $N_{info}$ is the intermediate variable, S1 is the first scaling factor, R is a first target code rate determined according to a MCS index, $Q_m$ is a first modulation strategy parameter determined according to the MCS index, and $N_{RE}$ is a total number of available resource elements.

9. The method according to claim 8, wherein the method further comprises at least one of the following:

the first radio resource overhead parameter is greater than or equal to a second radio resource overhead parameter of the first device type;

a value of the first radio resource overhead parameter comprises at least one of the following: 0, 6, 12, 18, 30;

if a configuration type of a demodulation reference signal is a first configuration type, then the first frequency-domain mapping parameter k=0, 1, 2, . . . , n−1, wherein n is an amount of resource units within a bandwidth portion occupied by a physical downlink shared channel, and n is a positive integer;

if the configuration type of the demodulation reference signal is a second configuration type, then the first frequency-domain mapping parameter k=4i+k'+Δ, wherein k is less than or equal to n, k' is 0 or 1, i is 0, 1, 2, . . . , and Δ is a positive integer greater than or equal to 0;

the first MCS parameter comprises at least one of a first modulation strategy parameter or a first target code rate;

the first scaling factor is less than or equal to a second scaling factor corresponding to the first device type;

the first scaling factor comprises at least one of the following: 1, 0.5, 0.25, 0.4.

10. The method according to claim 9, wherein for any modulation and coding scheme index, at least one of the followings is met:

the first modulation strategy parameter is less than or equal to a second modulation strategy parameter corresponding to the first device type; or the first target code rate is less than or equal to a second target code rate corresponding to the first device type.

11. The method according to claim 8, wherein at least one of the first radio resource overhead parameter or the first frequency-domain mapping parameter are used to determine the number of available resource elements in each physical resource block of a physical downlink shared channel, and at least one of the number of available resource elements, the first modulation and coding scheme parameter and the first scaling factor is used to determine the first maximum transport block size.

12. A communication device, comprising: a memory and a processor;

the memory is configured to store program instructions;

the processor is configured to call the program instructions in the memory to execute the processing method according to claim 8.

13. A non-transitory computer-readable storage medium, wherein the storage medium has a computer program stored thereon, and when the computer program is executed, the processing method according to claim 8 is implemented.

14. The method according to claim 8, wherein a channel carrying the service data comprises at least one of the following:

a physical downlink shared channel scrambled with a cell radio network temporary identifier;

a physical downlink shared channel scrambled with a modulation coding scheme cell radio network temporary identifier;

a physical downlink shared channel scrambled with a temporary cell radio network temporary identifier;

a physical downlink shared channel scrambled with a configured scheduling radio network temporary identifier;

a physical downlink shared channel scrambled with a system information radio network temporary identifier;

a physical downlink shared channel scrambled with a paging radio network temporary identifier;

a physical downlink shared channel scrambled with a random access radio network temporary identifier.

15. A processing method, wherein the method comprises:

determining a first maximum transport block size according to the number of available resource elements in each physical resource block of a physical downlink shared channel in a preset parameter, the first maximum transport block size is less than or equal to a second maximum transport block size corresponding to a first device type; wherein the number of available resource elements is determined according to at least one of a first radio resource overhead parameter or a first frequency-domain mapping parameter, the first radio resource overhead parameter is negatively correlated with the first maximum transport block size, and the first frequency-domain mapping parameter is negatively correlated with the first maximum transport block size;

determining a size of a first buffer of service data according to the first maximum transport block size, and determining a size of a second buffer of the service data according to a maximum data rate; wherein at least one of the first buffer or the second buffer is less than a buffer corresponding to a first device type, and the first buffer is a Layer 1 buffer, the second buffer is a Layer 2 buffer;

wherein the method further comprises:

when a type of a terminal device is a reduced-capability device, determining a preset modulation and coding scheme, MCS, list for the reduced-capacity device, determining a first MCS parameter according to the preset MCS list, wherein the first MCS parameter comprises at least one of a first modulation strategy parameter or a first target code rate;

calculating an intermediate variable according to a first scaling factor, wherein the intermediate variable $N_{info}$=S1*$N_{RE}$*R*$Q_m$*v; wherein $N_{info}$ is used for all service types, the intermediate variable $N_{info}$ is used to calculate a transport block size, and the intermediate variable $N_{info}$ is positively correlated with the transport block size; wherein $N_{info}$ is the intermediate variable, S1 is the first scaling factor, R is a first target code rate determined according to a modulation and coding strategy index, $Q_m$ is a first modulation strategy parameter determined according to an MCS index, and $N_{RE}$ is a total number of available resource elements.

16. The method according to claim 15, wherein the method further comprises at least one of the following:

the first radio resource overhead parameter is less than or equal to a second radio resource overhead parameter of the first device type;

a value of the first radio resource overhead parameter comprises at least one of the following: 0, 6, 12, 18, 30;

if a configuration type of a demodulation reference signal is a first configuration type, then the first frequency-domain mapping parameter k=0, 1, 2, . . . , n−1, wherein n is an amount of resource units within a bandwidth portion occupied by a physical downlink shared channel, and n is a positive integer;

if the configuration type of the demodulation reference signal is a second configuration type, then the first frequency-domain mapping parameter k=4i+k'+Δ, wherein k is less than or equal to n, k' is 0 or 1, i is 0, 1, 2, . . . , and Δ is a positive integer greater than or equal to 0;

the first MCS parameter comprises at least one of a first modulation strategy parameter or a first target code rate;

the first scaling factor is less than or equal to a second scaling factor corresponding to the first device type;

the first scaling factor comprises at least one of the following: 1, 0.5, 0.25, 0.4.

17. The method according to claim 16, wherein for any modulation and coding scheme index, at least one of the followings is met:

the first modulation strategy parameter is less than or equal to a second modulation strategy parameter corresponding to the first device type; or the first target code rate is less than or equal to a second target code rate corresponding to the first device type.

18. The method according to claim 15, wherein a channel carrying the service data comprises at least one of the following:

a physical downlink shared channel scrambled with a cell radio network temporary identifier;

a physical downlink shared channel scrambled with a modulation coding scheme cell radio network temporary identifier;

a physical downlink shared channel scrambled with a temporary cell radio network temporary identifier;

a physical downlink shared channel scrambled with a configured scheduling radio network temporary identifier;

a physical downlink shared channel scrambled with a system information radio network temporary identifier;

a physical downlink shared channel scrambled with a paging radio network temporary identifier;

a physical downlink shared channel scrambled with a random access radio network temporary identifier.

19. A communication device, comprising: a memory and a processor;

the memory is configured to store program instructions;

the processor is configured to call the program instructions in the memory to execute the processing method according to claim 15.

20. A non-transitory computer-readable storage medium, wherein the storage medium has a computer program stored thereon, and when the computer program is executed, the processing method according to claim 15 is implemented.

* * * * *